United States Patent
Seiki et al.

(10) Patent No.: US 12,283,014 B2
(45) Date of Patent: Apr. 22, 2025

(54) NON-TRANSITORY COMPUTER-READABLE STORAGE MEDIUM, INFORMATION PROCESSING METHOD, AND INFORMATION PROCESSING DEVICE

(71) Applicant: HOBONICHI CO., LTD., Tokyo (JP)

(72) Inventors: Masashi Seiki, Tokyo (JP); Hiroshi Goto, Tokyo (JP); Tomonori Taguchi, Tokyo (JP); Yutaro Chino, Tokyo (JP); Yoshito Fukuda, Tokyo (JP); Jou Watanabe, Tokyo (JP)

(73) Assignee: HOBONICHI CO., LTD., Tokyo (JP)

(*) Notice: Subject to any disclaimer, the term of this patent is extended or adjusted under 35 U.S.C. 154(b) by 0 days.

(21) Appl. No.: 18/817,884

(22) Filed: Aug. 28, 2024

(65) Prior Publication Data
US 2025/0078425 A1     Mar. 6, 2025

(51) Int. Cl.
*G06T 19/00* (2011.01)
*G06T 13/60* (2011.01)
*G06T 19/20* (2011.01)

(52) U.S. Cl.
CPC ............ *G06T 19/006* (2013.01); *G06T 13/60* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | |
|---|---|---|
| 5,583,972 A | 12/1996 | Miller |
| 2011/0195723 A1 | 8/2011 | Kim et al. |
| 2018/0259443 A1 | 9/2018 | Tsubota et al. |
| 2019/0147631 A1 | 5/2019 | Itoi |

FOREIGN PATENT DOCUMENTS

| | | |
|---|---|---|
| CN | 111143713 | 5/2020 |
| JP | H7-262403 A | 10/1995 |
| JP | H8-72965 A | 3/1996 |
| JP | H10-68906 A | 3/1998 |
| JP | 2013-92407 A | 5/2013 |
| JP | 2018-115907 A | 7/2018 |
| JP | 2018-146183 A | 9/2018 |
| JP | 2019-91203 A | 6/2019 |
| JP | 2021-9075 A | 1/2021 |
| JP | 2022-42249 A | 3/2022 |
| WO | WO2019097742 A | 5/2019 |

*Primary Examiner* — Robert J Craddock
(74) *Attorney, Agent, or Firm* — Bret E. Field; Bozicevic, Field & Francis LLP

(57) ABSTRACT

Provided are a program and the like, in which it is possible to display a globe in a photographed image and three-dimensionally display a cloud at the corresponding position. A program according to one aspect causes a computer to execute processing of acquiring an altitude of a cloud at each position, and displaying, when a globe of a reality space is held up, a globe of a first virtual space, in response to a movement of the globe of the reality space, while three-dimensionally displaying a cloud according to a specified altitude at a corresponding position on the first virtual space. Accordingly, it is possible to display the globe in the photographed image and three-dimensionally display the cloud at the corresponding position.

21 Claims, 19 Drawing Sheets

Raindrop Animation

Snow Animation

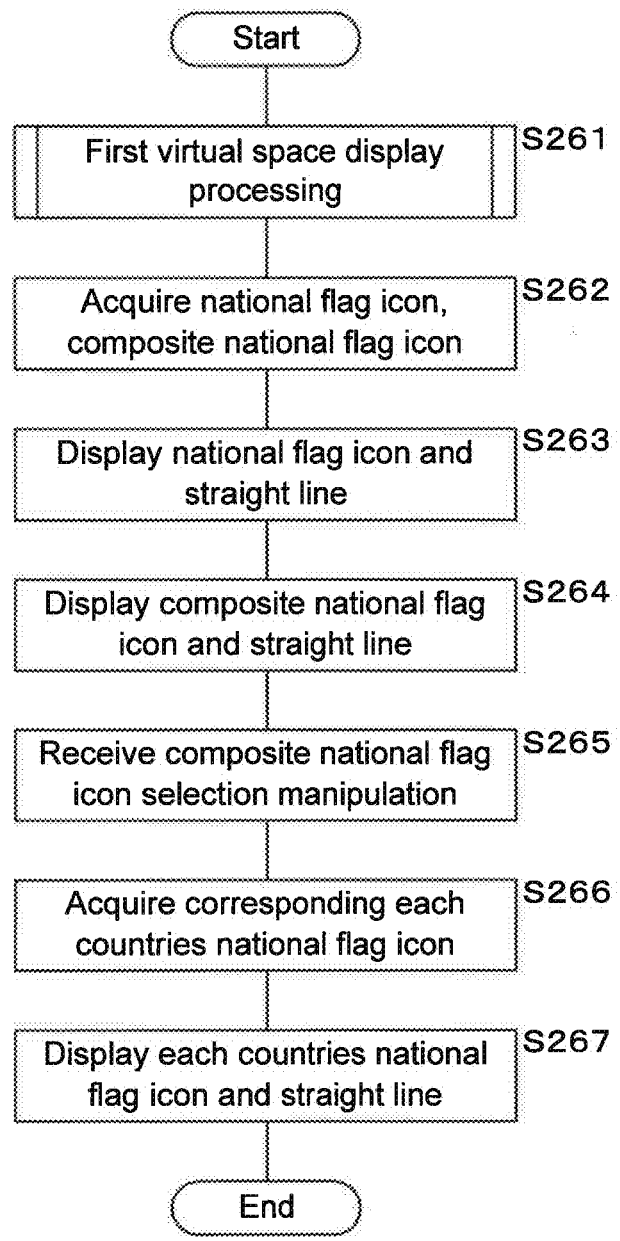

NON-TRANSITORY COMPUTER-READABLE STORAGE MEDIUM, INFORMATION PROCESSING METHOD, AND INFORMATION PROCESSING DEVICE

CROSS-REFERENCE TO RELATED APPLICATION

This non-provisional application claims priority under 35 U.S.C. § 119(a) on Patent Application No. 2023-142371 filed in Japan on Sep. 1, 2023, the entire contents of which are hereby incorporated by reference.

Recently, product development using an augmented reality (AR) system has been performed. In the AR system, an application program for recognizing an AR marker is installed in an information device including a camera and a display unit such as AR glasses (AR goggles) such as Apple (registered trademark) Vision Pro, a smart phone, a tablet terminal, and a portable game console. In a case where a subject with an AR marker is photographed using such an information device, the information device recognizes the AR marker, and displays a content according to the recognized AR marker to be superimposed on the photographed image. Accordingly, a user is capable of watching an image in which the content is superimposed on the subject that is a photographing target on the display unit. In Japanese Patent Laid-Open Publication No. 2013-92407, a system is disclosed in which a three-dimensional object is photographed, and additional information such as an image or a letter is displayed to be superimposed on the three-dimensional object in the photographed image.

DESCRIPTION

However, in the invention according to Japanese Patent Laid-Open Publication No. 2013-92407, there is a problem that it is not possible to display a globe (the three-dimensional object) in the photographed image and three-dimensionally display a cloud at the corresponding position.

One aspect is to provide a program and the like, in which it is possible to display a globe in a photographed image and three-dimensionally display a cloud at the corresponding position.

A program according to one aspect causes a computer to execute processing of acquiring an altitude of a cloud at each position, and displaying, when a globe of a reality space is held up, a globe of a first virtual space, in response to a movement of the globe of the reality space, while three-dimensionally displaying a cloud according to a specified altitude at a corresponding position on the first virtual space.

In one aspect, it is possible to display the globe in the photographed image and three-dimensionally display the cloud at the corresponding position.

The above and further objects and features will more fully be apparent from the following detailed description with accompanying drawings.

FIG. 19 is a flowchart illustrating a processing procedure when receiving a selection manipulation of the composite national flag icon.

Hereinafter, the invention will be described in detail, on the basis of the drawings illustrating embodiments.

EMBODIMENT 1

Embodiment 1 relates to a mode in which when a globe (an earth ball) of a reality space is held up, a globe of a first virtual space is displayed, and a cloud is three-dimensionally displayed at the corresponding position on the first virtual space.

Figure 1:
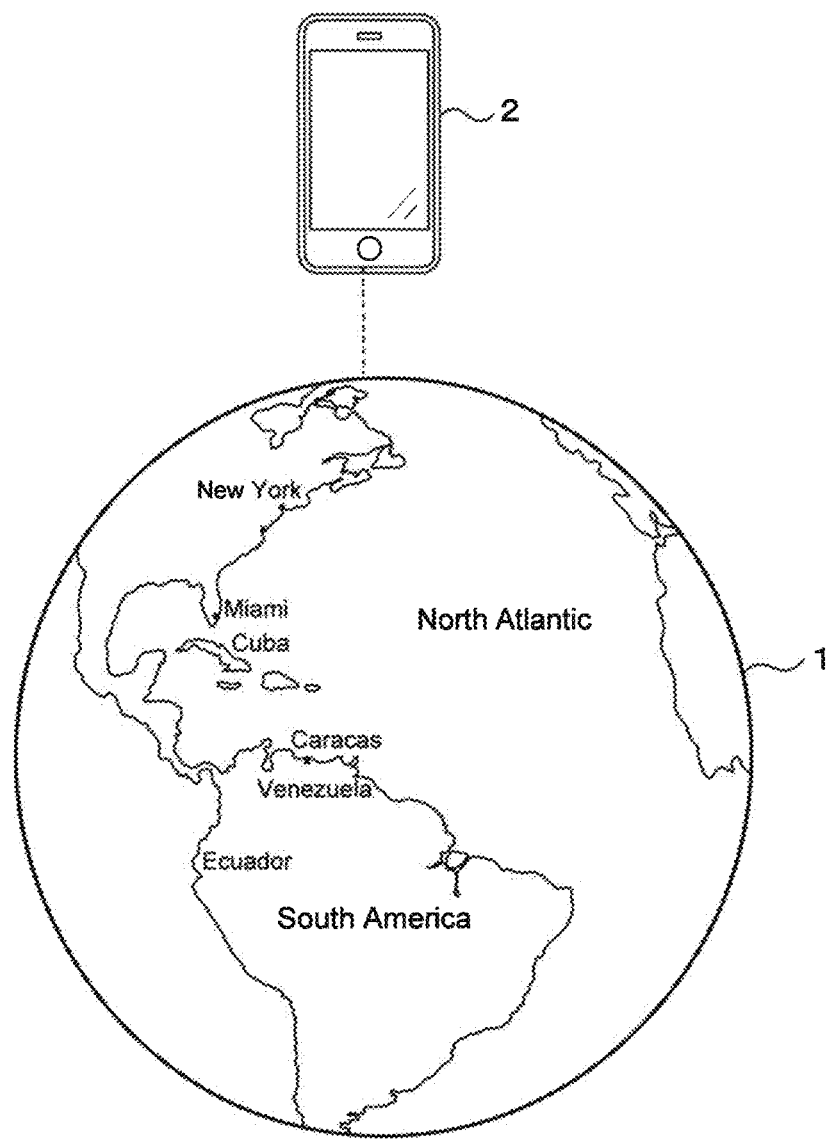
FIG. 1 is a schematic view illustrating a configuration example of an AR system.

FIG. 1 is a schematic view illustrating a configuration example of an AR system. The AR system of this embodiment includes a globe 1 that is a sphere having an AR marker (a marker) on the surface, and an information processing terminal 2, in which the globe 1 is a subject, and the globe 1 is used by being photographed with the information processing terminal 2.

The globe 1, for example, is a plastic hollow sphere, but is not limited thereto. A map on the earth is printed on the surface of the globe 1, and the AR marker is applied to a suitable position on the map. For example, in the example illustrated in FIG. 1, a name is applied to each ocean and each continent on the map, and a country name and a city name are applied to each country and each city. Such letters configure the AR marker.

Note that even though it is not illustrated in FIG. 1, in a case where the borderline of each country is included in the map, the borderline may also configure the AR marker. Note that in a case where the river, the plain, the mountain range, and the like in the map are separately colored with a predetermined color for each terrain, each color may also configure the AR marker.

Note that a predetermined mark for identifying each ocean, each ocean area, and the like may be applied to the ocean in the map. Alternatively, a predetermined mark for identifying a ship and an animal such as a turtle or a seagull may be applied. In addition, a predetermined mark for identifying each continent, each area, and the like may be applied to the continent in the map.

The information processing terminal 2 is a terminal device of each user. The information processing terminal 2, for example, is an information processing device such as AR glasses such as Apple Vision Pro, a smart phone, a mobile phone, a wearable device such as Apple Watch (registered trademark), a tablet, a game console, or a personal computer terminal. Hereinafter, for simplicity, the information processing terminal 2 can be alternatively referred to as a user terminal 2.

The user terminal 2 according to this embodiment acquires an infrared image of a cloud. The user terminal 2 estimates the altitude of the cloud at each position, on the basis of the acquired infrared image. In a case where the globe 1 of the reality space is held up, the user terminal 2 displays a globe of a first virtual space, in response to the movement of the globe 1 and three-dimensionally displays the cloud according to the specified altitude at the corresponding position on the first virtual space.

Figure 2:
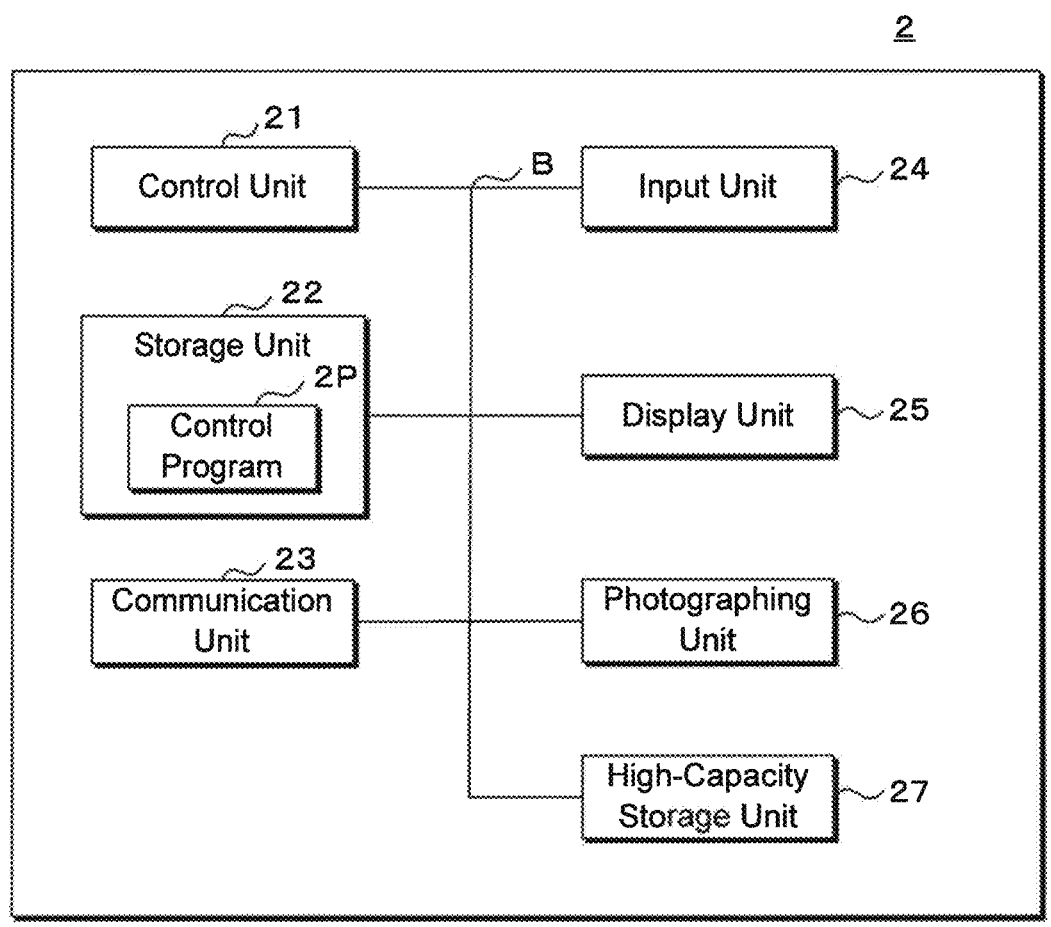
FIG. 2 is a block diagram illustrating a configuration example of a user terminal.

FIG. 2 is a block diagram illustrating a configuration example of the user terminal 2. The user terminal 2 includes a control unit 21, a storage unit 22, a communication unit 23, an input unit 24, a display unit 25, a photographing unit 26, and a high-capacity storage unit 27. Each configuration is connected by a bus B.

The control unit 21 includes an arithmetic processing device such as a central processing unit (CPU), a microprocessing unit (MPU), a graphics processing unit (GPU), a field programmable gate array (FPGA), a digital signal processor (DSP), or a quantum processor. The control unit 21 reads out and executes a control program 2P (a program product) stored in the storage unit 22 to perform various types of information processing, control processing, and the like according to the user terminal 2. Note that in FIG. 2, the control unit 21 is illustrated as a single processor, but the control unit may be a multiprocessor.

The storage unit 22 includes a memory element such as a random access memory (RAM) and a read only memory (ROM), and stores the control program 2P, data, or the like, required for the control unit 21 to execute processing. In addition, the storage unit 22 temporarily stores the data or the like, required for the control unit 21 to execute arithmetic processing. The communication unit 23 is a communication module for performing processing relevant to communication, and performs the reception and transmission of information with respect to an external information processing device or the like through a network N.

The input unit 24 may be a controller, a gesture input device for sensing a gesture, a keyboard, a mouse, or a touch panel integrated with the display unit 25. In the case of using the gesture input device, the control unit 21, for example, recognizes the position, the shape, and the like of a hand from the image of the hand photographed by the photographing unit 26. The control unit 21 determines the gesture (the movement) of the hand, on the basis of the recognized position, shape, and the like of the hand. The control unit 21 performs the corresponding manipulation, in accordance with the determined gesture of the hand. For example, in a case where a pinch gesture with the thumb and the index finger is determined, the control unit 21 may perform a manipulation of selecting an object at the position of the hand.

The display unit 25 is a liquid crystal display, an organic electroluminescence (EL) display, or the like, and displays various types of information, in accordance with the instruction of the control unit 21. The photographing unit 26, for example, is a photographing device such as a charge coupled device (CCD) camera and a complementary metal oxide semiconductor (CMOS) camera. Note that the photographing unit 26 may not be built in the user terminal 2, and may be configured by being directly connected to the user terminal 2 on the outside such that the photographing is available.

The high-capacity storage unit 27, for example, includes a recording medium such as a hard disk drive (HDD) or a solid state drive (SSD). Note that in this embodiment, the storage unit 22 and the high-capacity storage unit 27 may be configured as an integrated storage device. In addition, the high-capacity storage unit 27 may be composed of a plurality of storage devices. In addition, the high-capacity storage unit 27 may be an external storage device connected to the user terminal 2.

Figure 3:
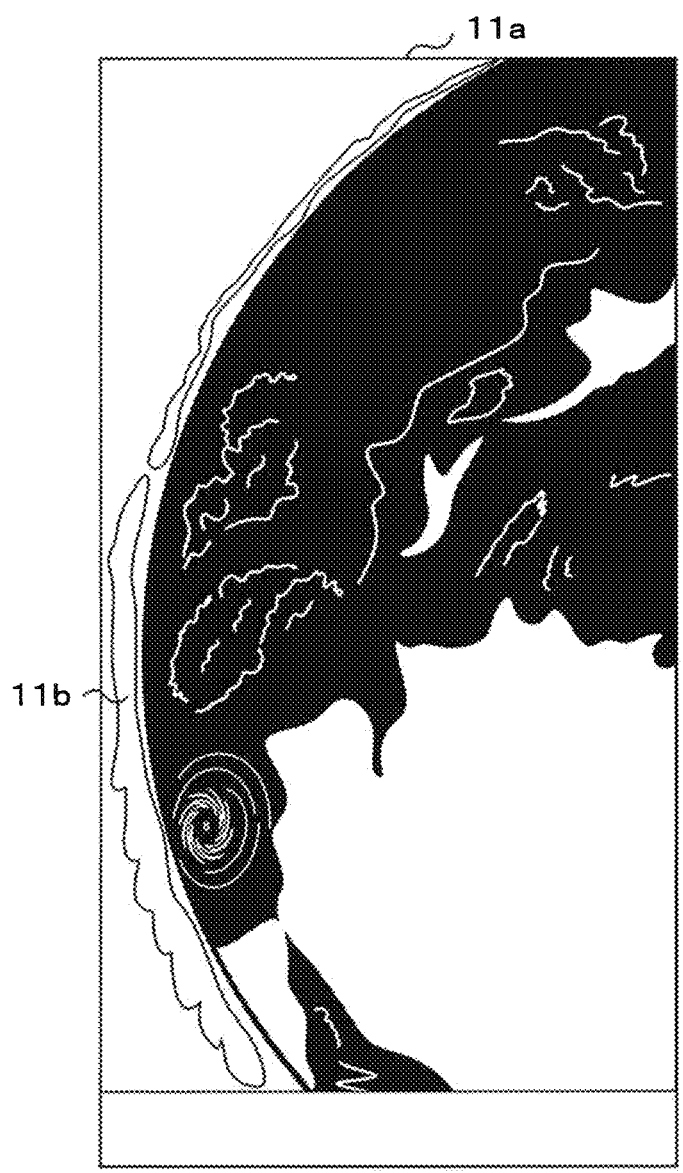
FIG. 3 illustrates processing of three-dimensionally displaying a cloud at a corresponding position on a first virtual space.

FIG. 3 illustrates processing of three-dimensionally displaying the cloud at the corresponding position on the first virtual space. The screen includes a first virtual space display section 11a and a cloud display section 11b. The first virtual space display section 11a is a display section for displaying the first virtual space. The first virtual space is a virtual space including a globe region and a reality space region outside the globe region. The cloud display section 11b is a display section for three-dimensionally displaying the cloud at the corresponding position on the first virtual space.

The user terminal 2 acquires an infrared (IR) image of the cloud from an external weather bureau server, a weather data distribution system, or the like. The infrared image of the cloud is one of satellite observation images, and is an image to which light and shade is applied in accordance with the intensity of infrared radiation emitted from the earth surface or the cloud. The infrared image is obtained by converting the observed radiant energy into a luminance temperature assuming that the observed radiant energy as approximately black body radiation, and imaging a temperature distribution.

The infrared image of the cloud is obtained by measuring a cloud top temperature with an infrared ray observed from a satellite, in which a warm surface is expressed with black, and a cold surface is expressed with white. The luminance temperature of the pixel of the cloud indirectly indicates the altitude of the cloud. In the troposphere where the cloud exists, the air temperature decreases as the altitude increases, and thus, the cloud top temperature can be converted into an altitude of the cloud top.

The user terminal 2 estimates the altitude of the cloud at each of the positions, on the basis of the acquired infrared image. Specifically, the user terminal 2 acquires the pixel value of each pixel of the infrared image that is the luminance temperature from the infrared image. The user terminal 2 determines whether each of the acquired pixel values corresponds to the cloud. For example, in a case where the luminance temperature of the image corresponding to each of the pixel values is lower than the earth surface temperature, the cloud is reflected in the pixel, and thus, the user terminal 2 determines that the pixel value corresponds to the cloud. Note that the determination processing of the cloud in the pixel is not limited, and other determination methods may be used.

The user terminal 2 linearly converts each of the pixel values to the altitude, for each of the pixels corresponding to the cloud. For example, the user terminal 2 converts each of the pixel values to altitude information on 3D graphics of the globe at the longitude and latitude to which each of the pixels corresponds.

Note that the conversion processing from the cloud top temperature to the altitude of the cloud top is not limited. For example, the user terminal 2 calculates the cloud top temperature from the luminance of the cloud included in the region of the infrared image of the cloud. The user terminal 2 may calculate the altitude corresponding to the luminance temperature, on the basis of relationship information between the air temperature and the altitude (for example, the profile of the air temperature in a vertical direction).

In a case where the globe 1 of the reality space is held up, the user terminal 2 imports the photographed image of the globe 1 having a marker on the surface through the photographing unit 26 to display the photographed image of the globe 1 including the globe region in the first virtual space display section 11a.

The user terminal 2 specifies each position of the globe region displayed in the photographed image, on the basis of marker information of the photographed image of the globe 1. For example, the user terminal 2 recognizes AR marker information, in accordance with the globe region displayed in the photographed image. The user terminal 2 extracts position information, on the basis of the recognized AR marker information.

The user terminal 2 three-dimensionally displays the cloud according to the specified altitude of the cloud at the corresponding position on the first virtual space, in the cloud display section 11b, with reference to the extracted position information. In the three-dimensional display (drawing) processing of the cloud, for example, a method referred to as volumetric rendering may be used. By using the volumetric rendering, it is possible to express the light and shade of transparency, in accordance with the thickness of the cloud, and express the cloud as a more realistic cloud.

The volumetric rendering is a method of displaying three-dimensional data formed by a cuboidal body referred to as a voxel by calculating a luminance in voxel unit and converting the three-dimensional data to the pixel of a two-dimensional image in which the entire three-dimensional data is overlooked. By performing the volumetric rendering, the surface of a rendering target becomes translucent, and the internal structure under the surface is expressed, and thus, a realistic cloud can be expressed.

Figure 4A:
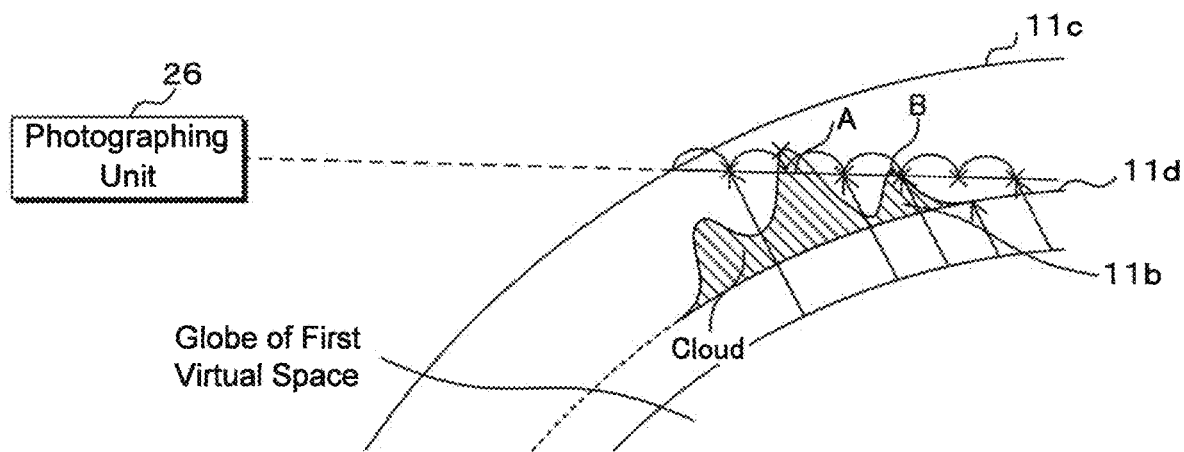
FIG. 4A is an explanatory drawing illustrating adjustment of light and shade of the cloud.
Figure 4B:
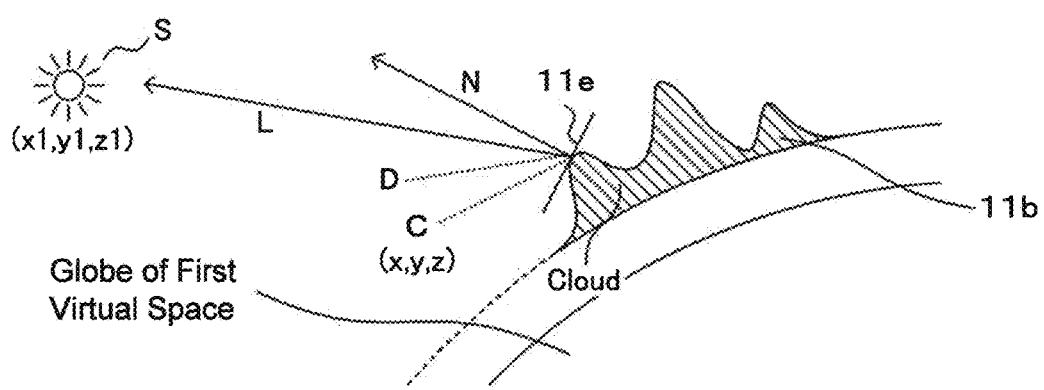
FIG. 4B is an explanatory drawing illustrating adjustment of light and shade of the cloud.

FIG. 4A and FIG. 4B are an explanatory drawing illustrating 3D drawing processing of the cloud. FIG. 4A is an explanatory drawing illustrating the adjustment of the light and shade of the cloud. FIG. 4A schematically illustrates the sectional view of the globe when the surface of the globe 1 is watched from the photographing unit 26. A reference numeral 11c indicates the upper limit altitude of the cloud, and a reference numeral 11d indicates the lower limit altitude of the cloud. In addition, hatching in the drawing indicates the cloud.

The user terminal 2 calculates the light and shade of the cloud at a specific point (pixel) on a screen by the following method. First, the user terminal 2 specifies an intersection between a visual line extending from the photographing unit 26 to the globe and the upper limit altitude 11c.

Next, the user terminal 2 further moves the visual line forward from the specified intersection by each fixed distance, and specifies each point for performing determination. The user terminal 2 further moves the visual line forward from the specified intersection by each fixed distance, and determines whether a predetermined condition is satisfied. The predetermined condition, for example, is that the visual line is lower than the lower limit altitude 11d of the cloud or the visual line is on a side opposite to the globe of the first virtual space. In a case where the predetermined condition is not satisfied, the user terminal 2 specifies the point for performing determination. In a case where the predetermined condition is satisfied, the user terminal 2 ends the specifying processing of the point for performing determination.

The user terminal 2, at each of the points, compares the altitude of the visual line at the point with the altitude of the cloud at the point (the latitude and longitude), and determines whether the altitude of the visual line is lower than or equal to the altitude of the cloud. In a case where it is determined that the altitude of the visual line is lower than or equal to the altitude of the cloud, the user terminal 2 increments a predetermined counter (hereinafter, referred to as a "cloud counter"). The user terminal 2 performs the determination at each of the points, and calculates the cloud counter. The user terminal 2 adjusts the light and shade of the pixel corresponding to the visual line such that the light and shade of the cloud is densed as the calculated cloud counter increases.

For example, in the example of FIG. 4A and FIG. 4B, the visual line extending from the photographing unit 26 is below the altitude of the cloud at two points of points A and B. Accordingly, in this case, the cloud counter is "2". The user terminal 2 adjusts the light and shade of the pixel corresponding to the visual line to a concentration according to the cloud counter "2".

By adjusting the light and shade of the cloud as described above, it is possible to draw the cloud of which the light and shade can be expressed in 3D graphics. The user terminal 2 displays the cloud drawn in 3D graphics in the cloud display section 11b.

Further, in this embodiment, the user terminal 2 performs processing of adjusting the brightness (shadow expression) of the cloud, in accordance with the slope of the cloud top.

FIG. 4B is an explanatory drawing illustrating the adjustment processing of the brightness of the cloud. The user terminal 2 calculates the degree to which the cloud top receives light (sunlight) from the front, on the basis of the direction of a light source (the sun) and the slope of the cloud top, and reflects the degree on the brightness of the cloud in the image to express a realistic cloud.

First, the user terminal 2 calculates the slope of the cloud top at a point (a pixel) of interest by a comparison with the altitude of the cloud top at the adjacent point. The cloud top is a boundary line between the saturated air including the cloud itself and the unsaturated air outside. For example, as illustrated in FIG. 4B, the point of interest is a point C, and a point D is the adjacent point of the interested point C. The user terminal 2 calculates the slope of an approximate straight line 11e (accurately, the approximate plane of the surface of the cloud top including the interested point C and the adjacent point D) as the slope of the cloud top, on the basis of the altitude of the cloud at the interested point C, and the altitude of the cloud at the adjacent point D.

Next, the user terminal 2 calculates the inner product of a normalized light source direction vector and a normalized cloud top normal vector. First, the user terminal 2 specifies the direction of the light source (S). For example, the user terminal 2 calculates the position of the sun at the current time by a simulation. The simulation is performed using a predetermined solar position calculation method for obtaining the altitude of the sun and the azimuth of the sun with a mathematical expression. The user terminal 2 specifies the direction of the sun seen from the earth as the direction of the light source (S), on the basis of the calculated position of the sun.

The user terminal 2 adjusts the brightness of the cloud top, on the basis of the specified direction of the light source (S) and the calculated slope between the clouds. The brightness of the cloud top can be calculated on the basis of the light source direction vector (L) and the cloud top normal vector (N).

Specifically, the user terminal 2 calculates the normalized light source direction vector (L), on the basis of the coordinate value (x,y,z) of the interested point C and the coordinate value (x1,y1,z1) of the light source (S). The user terminal 2 calculates the normalized cloud top normal vector (N), on the basis of the calculated slope between the clouds. The user terminal 2 calculates the inner product of the normalized light source direction vector (L) and the normalized cloud top normal vector (N).

In a case where the calculated inner product is a negative value, the user terminal 2 regards the inner product as 0. The user terminal 2 specifies a color subjected to linear interpolation between the RGB value of a color when the sunlight designated in advance does not shine at all (when the inner product is 0) and the RGB value of a color when the sunlight shines the most (when the inner product is 1), on the basis of the calculated inner product (a value of 0 to 1), and sets the specified color as the RGB value of the interested point C.

Figure 5:
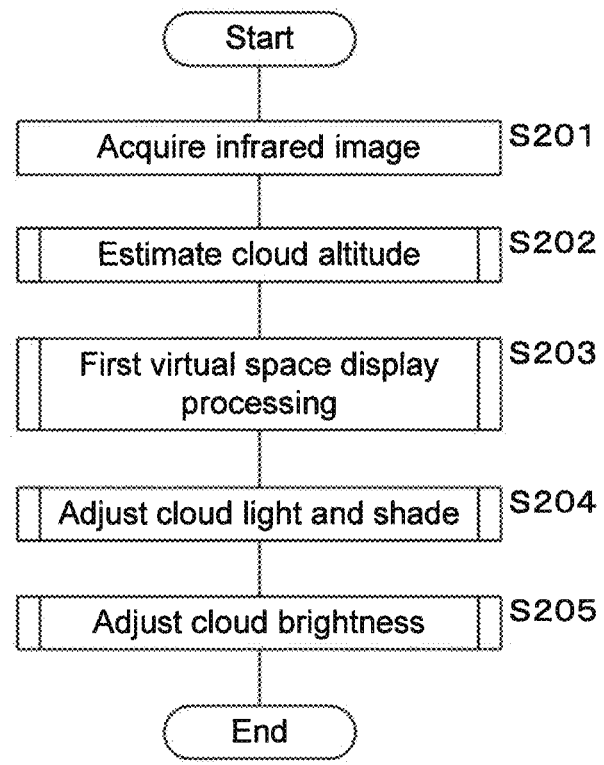
FIG. 5 is a flowchart illustrating a processing procedure when three-dimensionally displaying the cloud at the corresponding position on the first virtual space.

FIG. 5 is a flowchart illustrating a processing procedure when three-dimensionally displaying the cloud at the corresponding position on the first virtual space. The control unit 21 of the user terminal 2 acquires the infrared image of the cloud from the external weather bureau server, the weather data distribution system, or the like by the communication unit 23 (step S201).

The control unit 21 executes the subroutine of the processing of estimating the altitude of the cloud (step S202). Note that the subroutine of the processing of estimating the altitude of the cloud will be described below. In a case where the globe 1 of the reality space is held up, the control unit 21 executes the subroutine of the processing of displaying the first virtual space (step S203). Note that the subroutine of the processing of displaying the first virtual space will be described below.

The control unit 21 executes the subroutine of the processing of adjusting the light and shade of the cloud, with reference to the position information extracted on the basis of the AR marker information (step S204). The control unit 21 executes the subroutine of the processing of adjusting the brightness of the cloud (step S205). Note that the subroutine of adjusting the light and shade of the cloud and the subroutine of adjusting the brightness of the cloud will be described below. The control unit 21 ends the processing.

Figure 6:
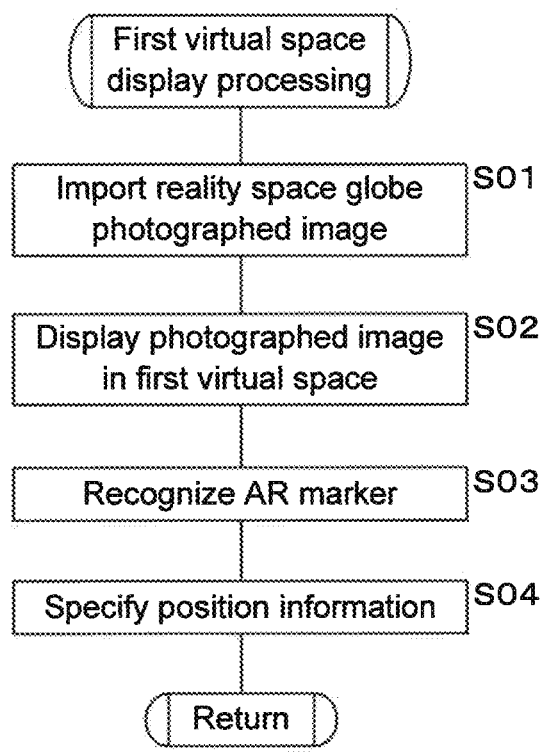
FIG. 6 is a flowchart illustrating a processing procedure of a subroutine of processing of displaying the first virtual space.

FIG. 6 is a flowchart illustrating the processing procedure of the subroutine of the processing of displaying the first virtual space. The control unit 21 of the user terminal 2 imports the photographed image of the globe 1 having the marker on the surface through the photographing unit 26 (step S01). In the photographed image, the globe region, and the reality space region outside the globe region are included. The control unit 21 displays the imported photographed image in the first virtual space by the display unit 25 (step S02).

The control unit 21 recognizes the AR marker information, in accordance with the globe region displayed in the photographed image (step S03). The control unit 21 specifies each of the positions of the globe region displayed in the photographed image, on the basis of the recognized marker information (step S04). The control unit 21 returns the subroutine of the display processing of the first virtual space.

Figure 7:
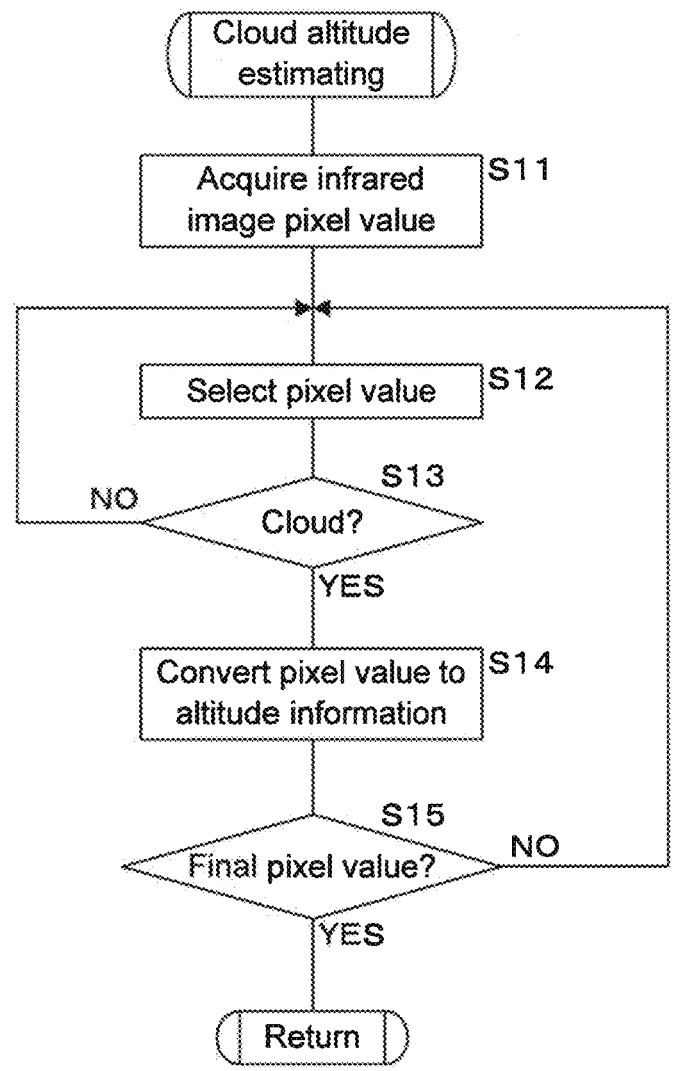
FIG. 7 is a flowchart illustrating a processing procedure of a subroutine of processing of estimating an altitude of the cloud.

FIG. 7 is a flowchart illustrating the processing procedure of the subroutine of the processing of estimating the altitude of the cloud. The control unit 21 of the user terminal 2 acquires the pixel value of each of the pixels of the infrared image from the infrared image (step S11). The control unit 21 selects one pixel value from a plurality of acquired pixel values (step S12).

The control unit 21 determines whether the acquired pixel value corresponds to the cloud (step S13). For example, in a case where the luminance temperature of the image corresponding to the pixel value is lower than the earth surface temperature, the control unit 21 determines that the pixel value corresponds to the cloud.

In a case where the acquired pixel value does not correspond to the cloud (NO in step S13), control unit 21 returns to the processing of step S12. In a case where the acquired pixel value corresponds to the cloud (YES in step S13), the control unit 21 converts the pixel value to the altitude information on 3D graphics of the globe at the longitude and latitude to which the pixel corresponds (step S14).

The control unit 21 determines whether the pixel value is the final pixel value among the plurality of pixel values (step S15). In a case where the pixel value is not the final pixel value (NO in step S15), the control unit 21 returns to the processing of step S12. In a case where the pixel value is the final pixel value (YES in step S15), the control unit 21 returns the subroutine of the estimation processing of the altitude of the cloud.

Figure 8:
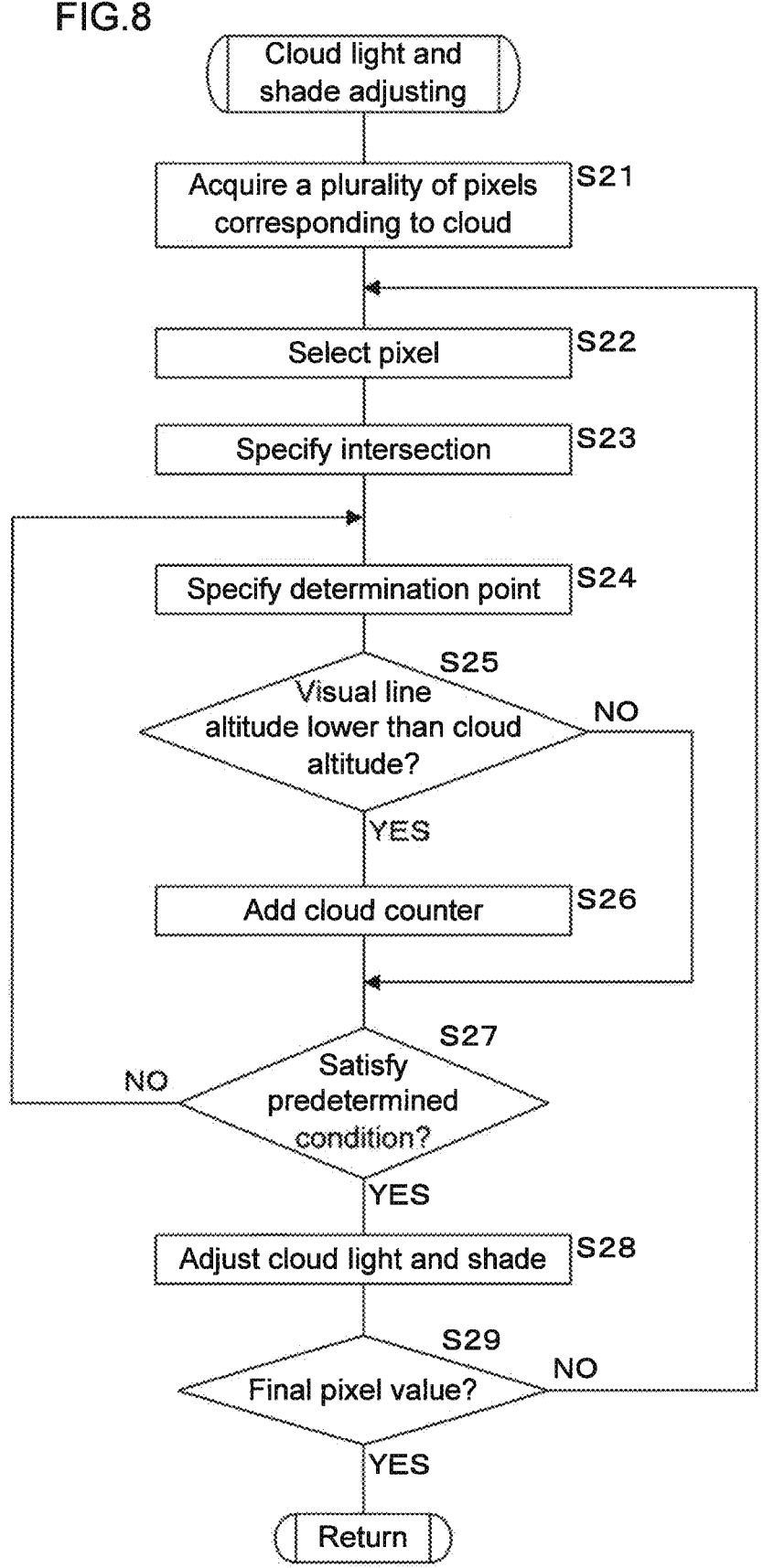
FIG. 8 is a flowchart illustrating a processing procedure of a subroutine of processing of adjusting the light and shade of the cloud.

FIG. 8 is a flowchart illustrating the processing procedure of the subroutine of the processing of adjusting the light and shade of the cloud. The control unit 21 of the user terminal 2 acquires a plurality of pixels corresponding to the cloud from the infrared image (step S21). The control unit 21 selects one pixel from the plurality of acquired pixels (step S22). The control unit 21, for the selected pixel, specifies the intersection between the visual line extending from the photographing unit 26 to the globe and the upper limit altitude of the cloud (step S23). The control unit 21 further moves the visual line forward from the specified intersection by each fixed distance, and specifies the point for performing determination (step S24).

The control unit 21, at the specified point, determines whether the altitude of the visual line at the point is lower than the altitude of the cloud at the position (the longitude and latitude) of the point (step S25). In a case where the altitude of the visual line is not lower than the altitude of the cloud (NO in step S25), the control unit 21 transitions to the processing of step S27 described below. In a case where the altitude of the visual line is lower than the altitude of the cloud (YES in step S25), the control unit 21 adds the cloud counter for drawing a cloud (step S26).

The control unit 21, for example, determines whether a predetermined condition until the visual line is lower than the lower limit altitude of the cloud or a predetermined condition until the visual line is on a side opposite to the globe of the first virtual space is satisfied (step S27). In a case where the predetermined condition is not satisfied (NO in step S27), the control unit 21 returns to the processing of step S24. In a case where the repeat condition is satisfied (YES in step S27), the control unit 21 adjusts the light and shade of the cloud in the pixel selected in step S22, on the basis of the added value of the cloud counter (step S28).

The control unit 21 determines whether the pixel is the final pixel among the plurality of pixels (step S29). In a case where the control unit 21 determines that the pixel is not the final pixel (NO in step S29), the control unit 21 returns the processing to step S22. In a case where the control unit 21 determines that the pixel is the final pixel (YES in step S29), the control unit 21 returns the subroutine of the adjustment processing of the light and shade of the cloud.

Figure 9:
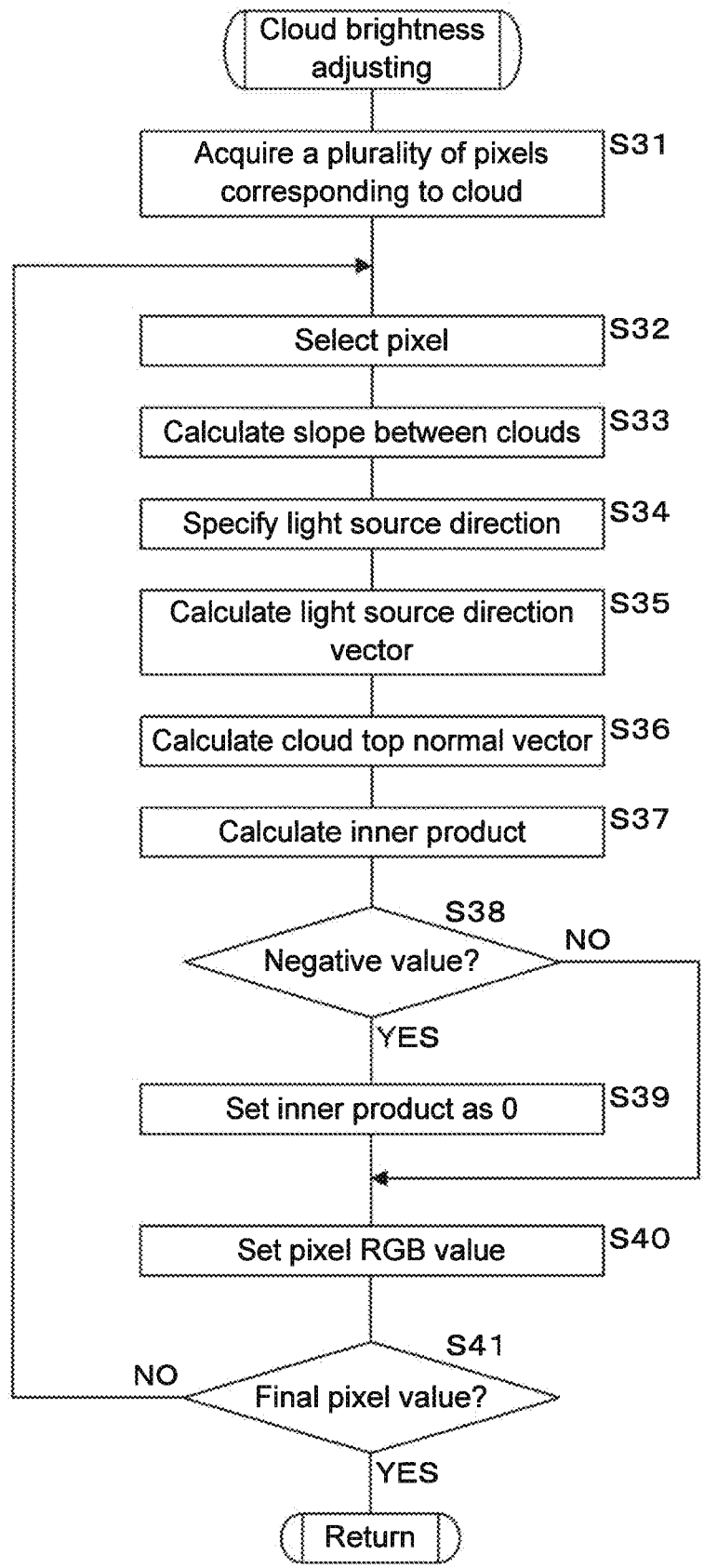
FIG. 9 is a flowchart illustrating a processing procedure of a subroutine of processing of adjusting brightness of the cloud.

FIG. 9 is a flowchart illustrating the processing procedure of the subroutine of the processing of adjusting the brightness of the cloud. The control unit 21 of the user terminal 2 acquires the plurality of pixels corresponding to the cloud from the infrared image (step S31). The control unit 21 selects one pixel from the plurality of acquired pixels (step S32).

The control unit 21 compares the altitude of the cloud corresponding to the acquired pixel with the altitude of the cloud top adjacent to the pixel to calculate the slope between the clouds in the pixel (step S33). For example, the control unit 21 acquires the coordinate value of the pixel, and each coordinate value of the cloud top adjacent to the pixel, on the basis of the altitude of the cloud at each position. The control unit 21 may calculate the slope of the approximate straight line formed by each of the acquired coordinate values, as the slope between the clouds.

The control unit 21 calculates the position of the sun at the current time by the simulation, and specifies the direction of the sun seen from the earth as the light source direction, on the basis of the calculated position of the sun (step S34). The control unit 21 calculates the normalized light source direction vector, on the basis of the coordinate value of the pixel and the coordinate value of the light source (step S35). The control unit 21 calculates the normalized cloud top normal vector, on the basis of the calculated slope between the clouds (step S36).

The control unit 21 calculates the inner product of the normalized light source direction vector and the normalized cloud top normal vector (step S37). The control unit 21 determines whether the calculated inner product is a negative value (step S38). In a case where the calculated inner product is not a negative value (NO in step S38), the control unit 21 transitions to the processing of step S40 described below.

In a case where the calculated inner product is a negative value (YES in step S38), the control unit 21 sets the inner product as 0 (step S39). The control unit 21 specifies the color subjected to the linear interpolation between the RGB value of the color when the sunlight designated in advance does not shine at all (when the inner product is 0) and the RGB value of the color when the sunlight shines the most (when the inner product is 1), on the basis of the calculated inner product (a value of 0 to 1), and sets the specified color as the RGB value of the pixel (step S40).

The control unit 21 determines whether the pixel value is the final pixel value among the plurality of pixel values (step S41). In a case where the pixel value is not the final pixel value (NO in step S41), the control unit 21 returns to the processing of step S32. In a case where the control unit 21 determines that the pixel value is the final pixel value (YES in step S41), the control unit 21 returns the subroutine of the adjustment processing of the brightness of the cloud.

Note that in a case where a movement such as the rotation of the globe 1, or a change in the relative position between the user terminal 2 and the globe 1 is detected, the user terminal 2 imports again the photographed image of the globe 1, in response to the detected movement. The user terminal 2 displays the photographed image of the globe 1 that is imported again in the first virtual space display section 11a.

As with the processing described above, the user terminal 2 specifies again each of the positions of the globe region displayed in the photographed image, on the basis of the marker information in the photographed image of the globe 1. The user terminal 2 displays the globe of the first virtual space, and three-dimensionally displays the cloud according to the altitude of the cloud at each position specified again on the first virtual space.

According to this embodiment, it is possible to display the globe of the first virtual space, and three-dimensionally display the cloud at the corresponding position on the first virtual space.

According to this embodiment, by three-dimensionally displaying the cloud, it is possible to attain the expression of a more realistic cloud.

According to this embodiment, it is possible to adjust the light and shade of the cloud at each position, on the basis of the visual line with respect to the globe of the first virtual space, and the altitude of the cloud at each position.

According to this embodiment, it is possible to adjust the brightness of the cloud at each position, on the basis of the light source and the slope between the clouds.

EMBODIMENT 2

Embodiment 2 relates to a mode in which a raindrop animation or a snow animation is displayed at each position, according to rainfall. Note that the description of the contents overlapping with those in Embodiment 1 will be omitted.

Figure 10A:
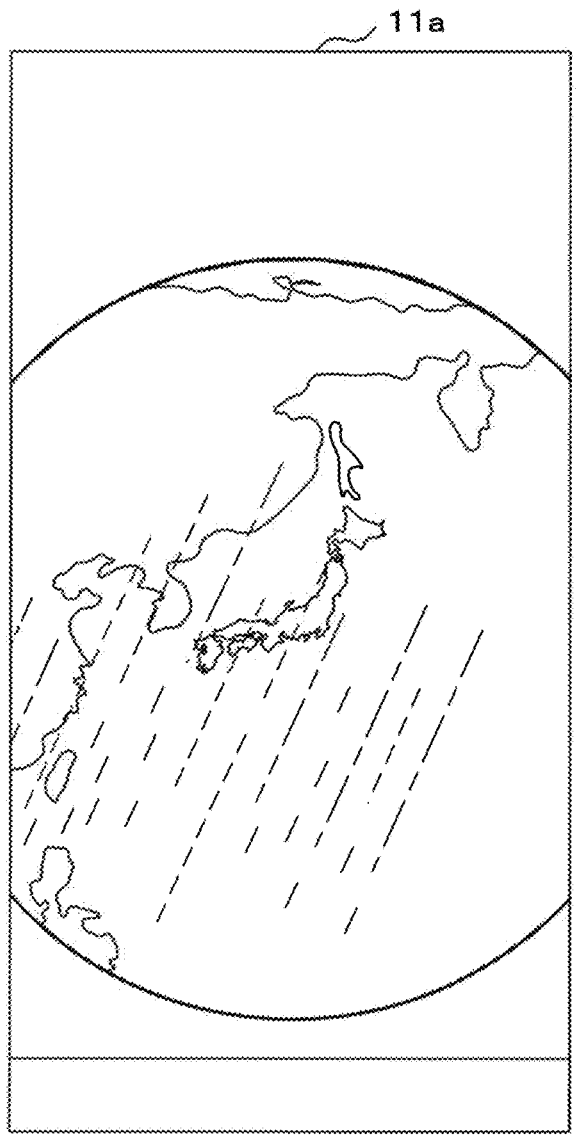
FIG. 10A is an explanatory drawing illustrating an example of a display screen of an animation based on rainfall.
Figure 10B:
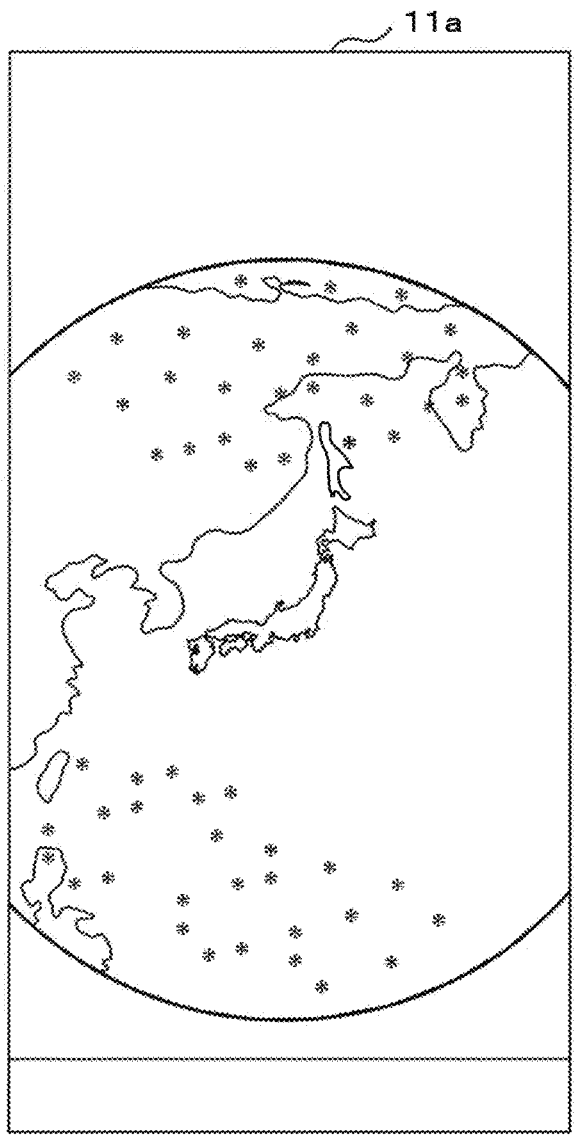
FIG. 10B is an explanatory drawing illustrating an example of a display screen of an animation based on rainfall.

FIG. 10A and FIG. 10B are an explanatory drawing illustrating an example of a display screen of an animation based on the rainfall. FIG. 10A is an explanatory drawing illustrating an example of a display screen of the raindrop animation. FIG. 10B is an explanatory drawing illustrating an example of a display screen of the snow animation.

In a case where the globe 1 of the reality space is held up, the user terminal 2 imports the photographed image of the globe 1 through the photographing unit 26, to display the photographed image of the globe 1 including the globe region in the first virtual space display section 11a.

The user terminal 2 specifies each of the positions of the globe region displayed in the photographed image, on the basis of the marker information in the photographed image of the globe 1. For example, the user terminal 2 recognizes the AR marker information, in accordance with the globe region displayed in the photographed image. The user terminal 2 extracts the position information, on the basis of the recognized AR marker information.

The user terminal 2 acquires rainfall data and air temperature data at each position from the external weather bureau server, the weather data distribution system, or the like, with reference to the extracted position information. For example, the rainfall data is a rainfall bitmap representing the rainfall at each position, and the air temperature data is an air temperature bitmap representing the air temperature at each position.

The user terminal 2 specifies the rainfall of a region specified by a plurality of position groups, on the basis of the acquired rainfall data. Specifically, the user terminal 2 specifies a rainfall region where it is raining, on the basis of the acquired rainfall data, with reference to the position information extracted on the basis of the AR marker information.

The user terminal 2 specifies the rainfall of the specified rainfall region. For example, the user terminal 2 acquires the rainfall of a position (the longitude and latitude) corresponding to each pixel value in the rainfall region from the rainfall data. The user terminal 2 calculates the average value of the acquired rainfall as the rainfall of the rainfall region. Note that specifying processing of the rainfall of the rainfall region is not limited to the average value. For example, the central value or the mode value of a plurality of values of rainfall (the most frequent value among the plurality of values of rainfall) may be used. Note that the rainfall may be randomly selected from the plurality of values of rainfall.

The user terminal 2 selects a region, in accordance with weighting according to the rainfall of the specified rainfall region. Specifically, the user terminal 2 creates a region list by pairing the longitude and latitude with the rainfall for the specified rainfall region. The user terminal 2 selects one region by using a random number from the created region list for each raindrop with a probability weighted in accordance with the rainfall of the region. For the random number, for example, an Alias method function (algorithm) that is a random number generation method based on a discrete probability distribution may be used.

The user terminal 2 displays the raindrop animation in the selected region. The user terminal 2 repeats the display processing of the raindrop animation described above until a predetermined number of raindrops is reached (for example, 1000). Note that the predetermined number of raindrops may be dynamically changed in accordance with the total rainfall. As illustrated in FIG. 10A, a particle special effect for simulating the raindrop animation is displayed in the rainfall region.

The user terminal 2 acquires the longitude and latitude at each position in the selected region. The user terminal 2 acquires the air temperature at each position from the air temperature data, on the basis of the acquired longitude and latitude at each position. The user terminal 2 determines whether the acquired air temperature is lower than or equal to a predetermined temperature (for example, minus 6 degrees).

In a case where the acquired air temperature is lower than or equal to the predetermined temperature, the user terminal 2 displays the snow animation in the region, instead of the raindrop animation. As illustrated in FIG. 10B, a particle special effect for simulating the snow animation is displayed in the rainfall region.

Figure 11:
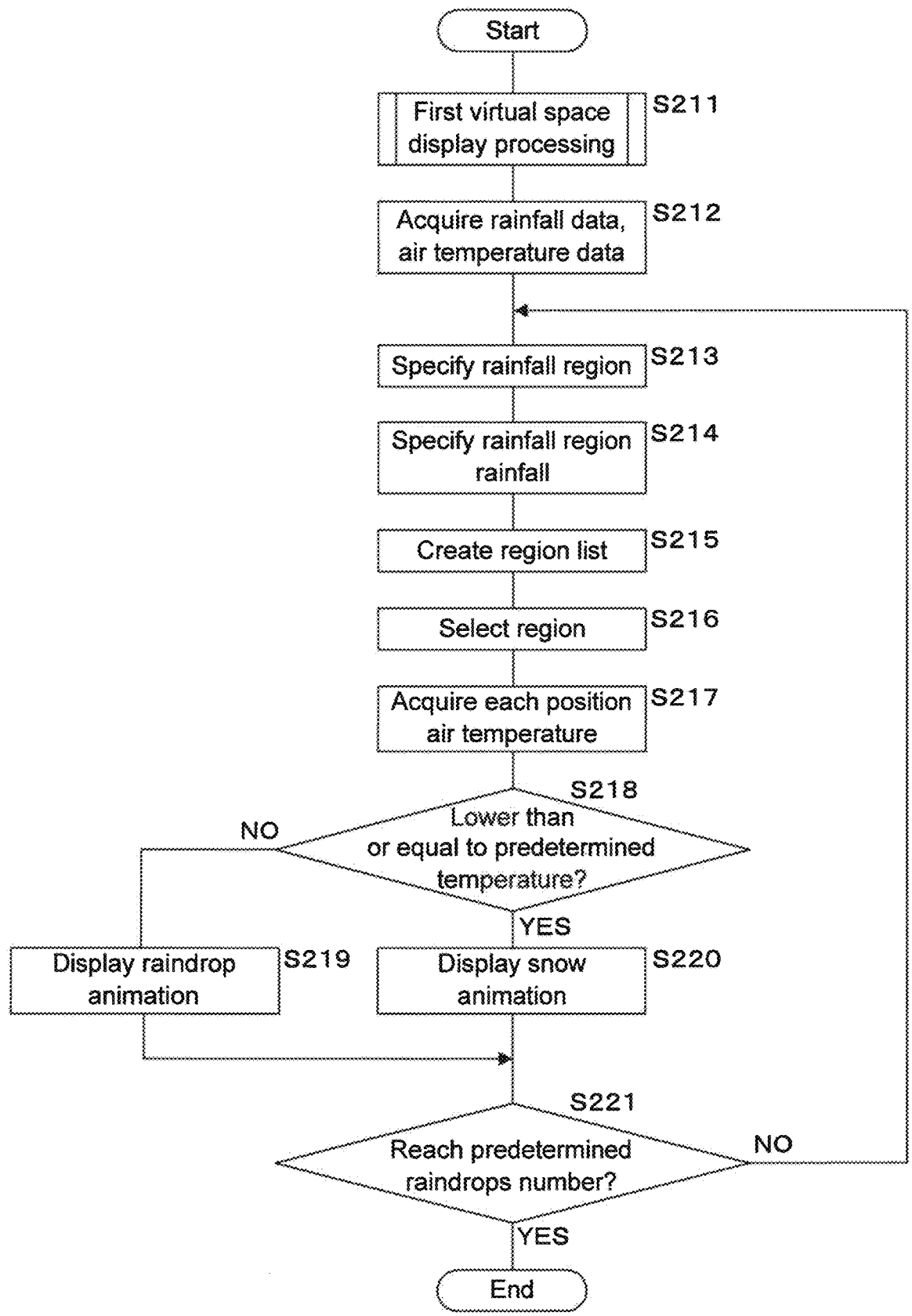
FIG. 11 is a flowchart illustrating a processing procedure when displaying the animation on the basis of the rainfall.

FIG. 11 is a flowchart illustrating a processing procedure when displaying the animation on the basis of the rainfall. In a case where the globe 1 of the reality space is held up, the control unit 21 of the user terminal 2 executes the subroutine of the processing of displaying the first virtual space (step S211). The control unit 21, for example, acquires the rainfall data and the air temperature data at each position of the globe region of the first virtual space from the weather data distribution system or the like by the communication unit 23 (step S212).

The control unit 21 specifies a rainfall region where it is raining, on the basis of the acquired rainfall data, with reference to the position information extracted on the basis of the AR marker information (step S213). The control unit 21 specifies the rainfall of the specified rainfall region (step S214). For example, the control unit 21 acquires the rainfall at the position corresponding to each of the pixel value in the rainfall region from the rainfall data. The control unit 21 calculates the average value of the acquired rainfall as the rainfall of the rainfall region.

The control unit 21 creates the region list by pairing the longitude and latitude with the rainfall for the specified rainfall region (step S215). The control unit 21 selects one region by using the random number from the created region list for each raindrop with the probability weighted in accordance with the rainfall of the specified rainfall region (step S216). The control unit 21 acquires the air temperature at each position in the selected region from the air temperature data (step S217). The control unit 21 determines whether the acquired air temperature is lower than or equal to the predetermined temperature (step S218).

In a case where the acquired air temperature is higher than the predetermined temperature (NO in step S218), the control unit 21 displays the raindrop animation in the selected region by the display unit 25 (step S219), and transitions to the processing of step S221 described below. In a case where the acquired air temperature is lower than or equal to the predetermined temperature (YES in step S218), the control unit 21 displays the snow animation in the region by the display unit 25, instead of the raindrop animation (step S220).

The control unit 21 determines whether the predetermined number of raindrops displayed on the screen is reached (step S221). In a case where the predetermined number of raindrops is not reached (NO in step S221), the control unit 21 returns to the processing of step S213. In a case where the predetermined number of raindrops is reached (YES in step S221), the control unit 21 ends the processing.

According to this embodiment, it is possible to display the raindrop animation at each position, in accordance with the rainfall.

According to this embodiment, it is possible to display the snow animation at a position where the air temperature at each position is lower than or equal to the predetermined temperature, instead of the raindrop animation.

EMBODIMENT 3

Embodiment 3 relates to a mode in which a character performing explanation is displayed as augmented reality. Note that the description of the contents overlapping with those in Embodiments 1 and 2 will be omitted. In the first virtual space, the character performing the explanation can be displayed as the augmented reality.

Figure 12A:
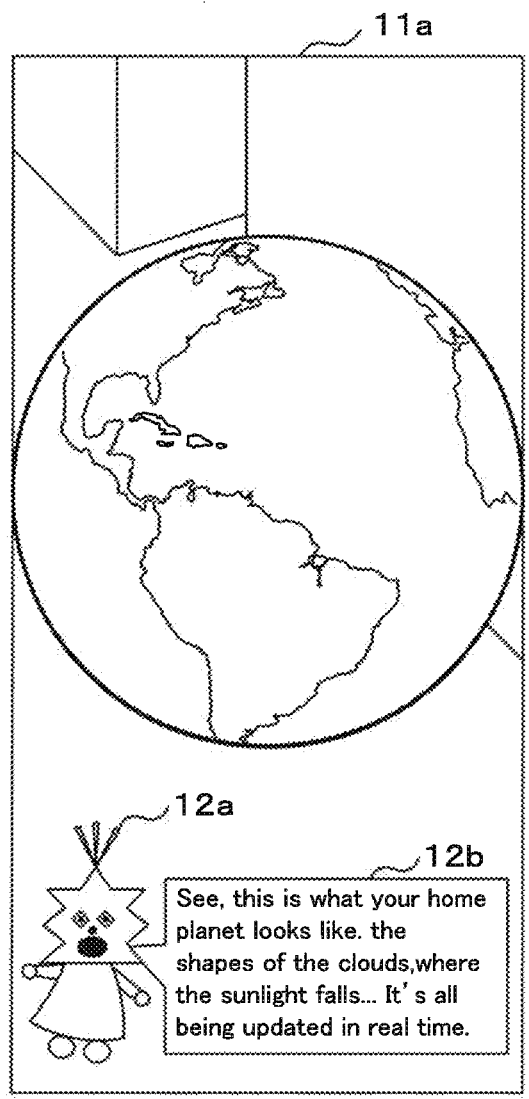
FIG. 12A is an explanatory drawing illustrating an example of a screen displaying a character as augmented reality.
Figure 12B:
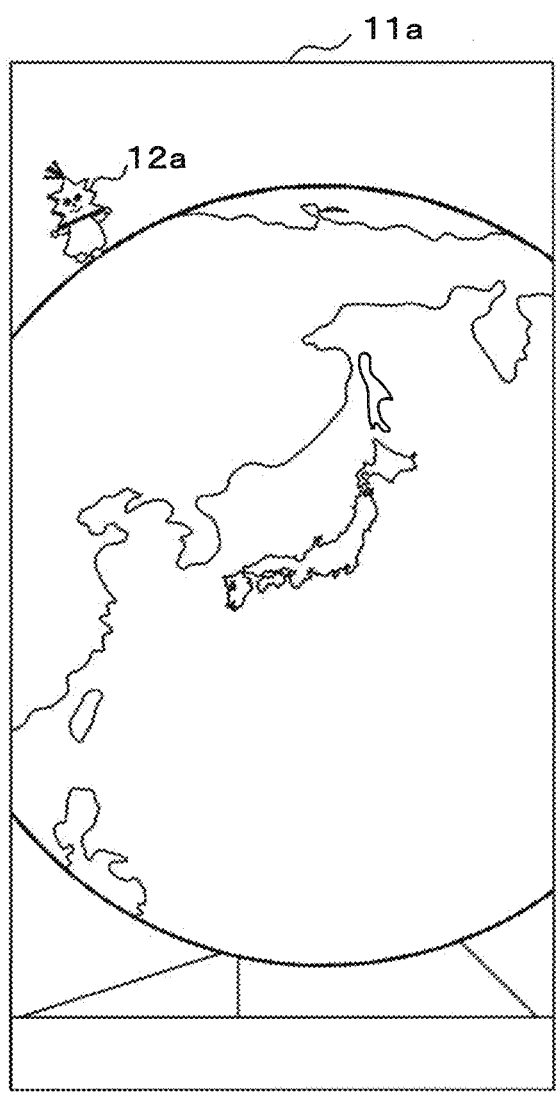
FIG. 12B is an explanatory drawing illustrating an example of a screen displaying a character as augmented reality.

FIG. 12A and FIG. 12B are an explanatory drawing illustrating an example of a screen displaying the character as the augmented reality. FIG. 12A is an explanatory drawing illustrating an example of a display screen with character explanation. FIG. 12B is an explanatory drawing illustrating an example of a display screen without character explanation.

The screen includes a character display section 12a and an explanation information display section 12b. The character display section 12a is a display section for displaying the character. Note that the character display section 12a is displayed in the first virtual space, in accordance with the display position of the character. The explanation information display section 12b is a display section for displaying explanation information explained by the character.

The user terminal 2 acquires image data of the character and the explanation information from a server device or the like. Note that the image data of the character and the explanation information may be stored in advance in the storage unit 22 or the high-capacity storage unit 27 of the user terminal 2.

The user terminal 2 displays the acquired image data of the character as the augmented reality in the first virtual space. Note that the display position of the character is not particularly limited. For example, the character may be displayed as the augmented reality in the globe region of the first virtual space, or the reality space region outside the globe region.

In a case where the character performs the explanation, the user terminal 2 displays the acquired explanation information in the explanation information display section 12b. The explanation, for example, includes a method for manipulating this AR system, the explanation of a screen, the explanation of an object (a cloud, a raindrop, a national flag, or the like) displayed on the screen, or the like. Note that the user terminal 2 may display the explanation information in the explanation information display section 12b, and may output the explanation information by a speaker. In a case where the character does not perform the explanation, the user terminal 2 moves the character on the globe of the first virtual space.

As illustrated in FIG. 12B, in a case where the character does not perform the explanation, the character is moved above the globe of the first virtual space. Note that user terminal 2 may move the character not only above the globe but also to any position around the globe or in the globe region.

Figure 13:
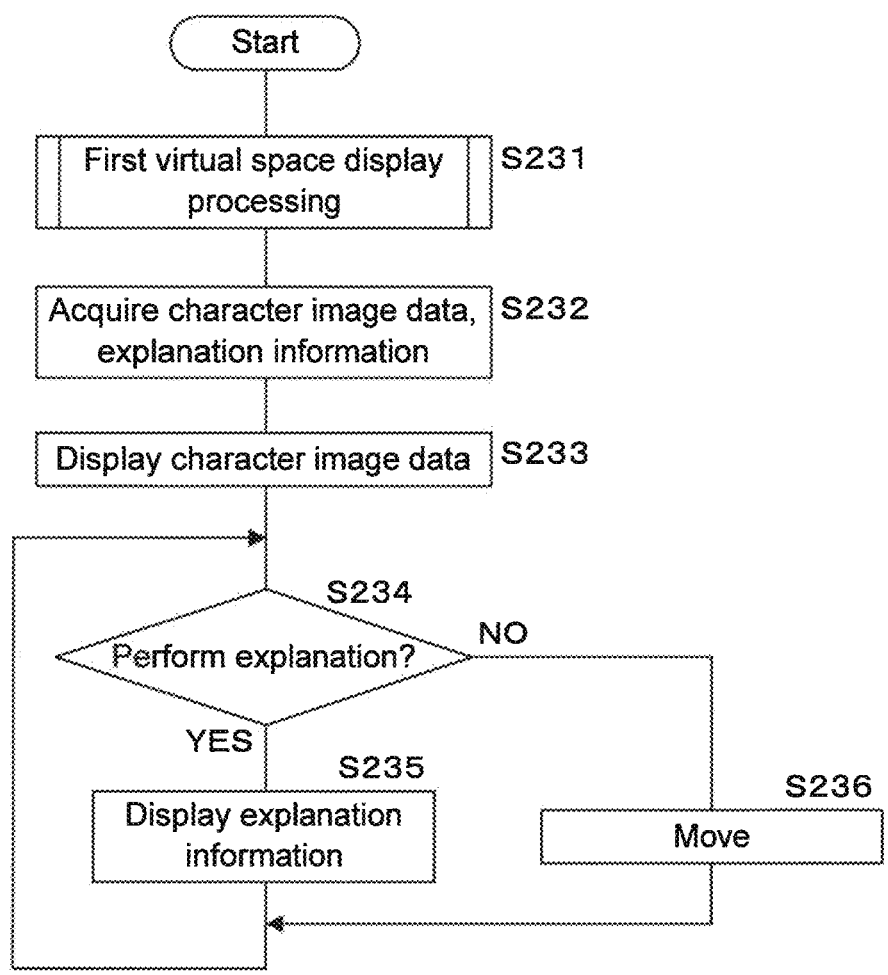
FIG. 13 is a flowchart illustrating a processing procedure when displaying the character as the augmented reality.

FIG. 13 is a flowchart illustrating a processing procedure when displaying the character as the augmented reality. In a case where the globe 1 of the reality space is held up, the control unit 21 of the user terminal 2 executes the subroutine of the processing of displaying the first virtual space (step S231). The control unit 21 acquires the image data of the character and the explanation information from the server device through the communication unit 23 (step S232).

The control unit 21 displays the acquired image data of the character as the augmented reality in the first virtual space through the display unit 25 (step S233). The control unit 21 determines whether the character performs the explanation (step S234). In a case where the character performs the explanation (YES in step S234), the control unit 21 displays the acquired explanation information by the display unit 25 (step S235). The control unit 21 returns to the processing of step S234.

In a case where the character does not perform the explanation (NO in step S234), the control unit 21 moves the character on the globe of the first virtual space (step S236). For example, the control unit 21 may move the character above or to an opposite side of the globe of the first virtual space. The control unit 21 returns to the processing of step S234.

Subsequently, processing of displaying a wind flow according to information relevant to wind on the globe of the first virtual space will be described.

Figure 14:
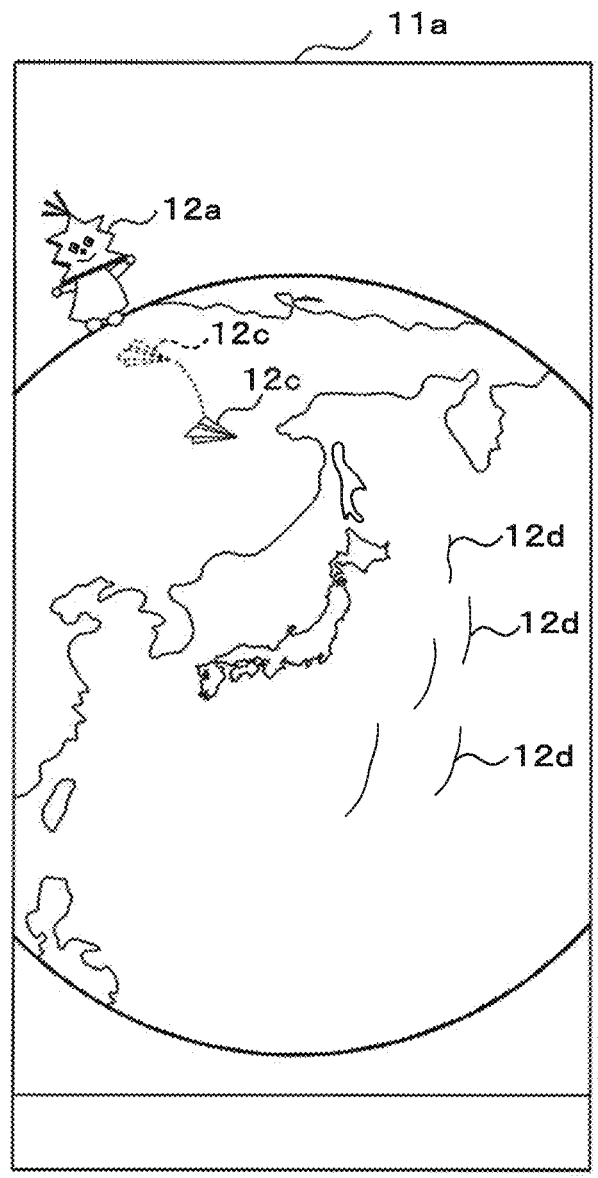
FIG. 14 is an explanatory drawing illustrating an example of a screen displaying a wind flow on a globe of the first virtual space.

FIG. 14 is an explanatory drawing illustrating an example of a screen displaying the wind flow on the globe of the first virtual space. Note that the same reference numerals will be applied to the contents overlapping with those in FIG. 12A and FIG. 12B, and the description will be omitted. The screen includes an object display section 12c and a wind display section 12d.

The object display section 12c is a display section for displaying an object. The object, for example, is a paper airplane, an air ball, a kite, or the like that is moved in accordance with the wind flow. The wind display section 12d is a display section for displaying the wind flow. Note that in FIG. 14, an example is illustrated in which the object is a paper airplane, but the same can be applied to other types of objects.

The user terminal 2 acquires the information relevant to the wind at each position from the external weather bureau server, the weather data distribution system, or the like. The information relevant to the wind, for example, includes a wind speed, a wind direction, or the like. The user terminal 2 displays the wind flow (the wind direction) according to the acquired information relevant to the wind on the globe of the first virtual space. As illustrated, the wind flow is illustrated in the wind display section 12d.

In addition, a display mode of the wind flow can be changed on the basis of the information relevant to the wind and information relevant to the air temperature at each position. Specifically, the user terminal 2 acquires the information relevant to the air temperature (the air temperature data) at each position from the external weather bureau server, the weather data distribution system, or the like. For example, the information relevant to the air temperature is the air temperature bitmap representing the air temperature at each position.

The user terminal 2 displays the wind flow according to the information relevant to the wind and changes the display color of the wind flow, on the basis of the acquired information relevant to the air temperature at each position. The display color may be suitably set in accordance with the air temperature. For example, a display color at a high temperature (28° C. or higher) may be set to red, a display color at a medium temperature (10° C. or higher and lower than 28° C.) may be set to yellow, a display color at a low temperature (3° C. or higher and lower than 10° C.) may be set to blue, and a display color at an extremely low temperature (lower than 3° C.) may be set to white.

Note that the display mode of the wind flow is not limited to color coding display, but may be the shape of the wind flow or other various forms of expression.

The user terminal 2 acquires image data of the paper airplane from the server device or the like. Note that the image data of the paper airplane may be stored in advance in the storage unit 22 or the high-capacity storage unit 27 of the user terminal 2. The user terminal 2 acquires an animation that the character throws the paper airplane from the server device or the like. Note that the animation may be stored in advance in the storage unit 22 or the high-capacity storage unit 27 of the user terminal 2.

The user terminal 2 executes the acquired animation. The user terminal 2 displays the acquired image data of the paper airplane in the object display section 12c. The user terminal 2 moves the paper airplane displayed in the object display section 12c, in accordance with the wind flow, on the basis of the information relevant to the wind. As illustrated, the paper airplane displayed in the object display section 12c is moved in accordance with the wind flow blowing from the north to the southeast.

Note that the user terminal 2, for example, may control the movement speed of the paper airplane, in accordance with the wind speed.

Figure 15:
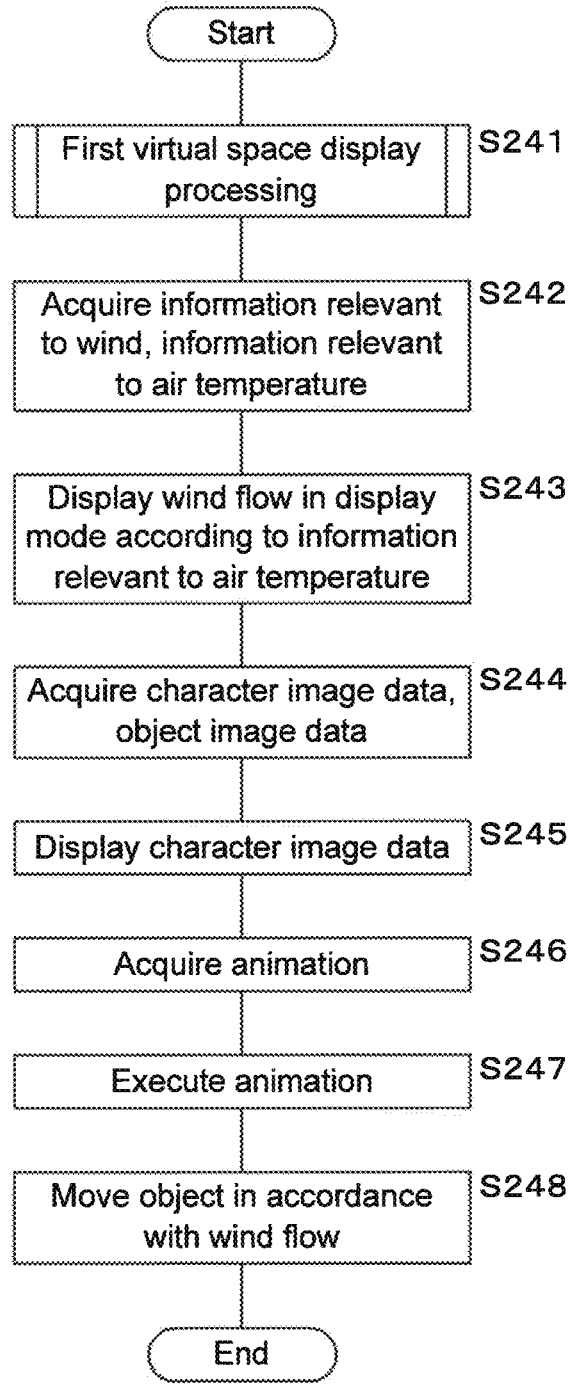
FIG. 15 is a flowchart illustrating a processing procedure when displaying the wind flow on the globe of the first virtual space.

FIG. 15 is a flowchart illustrating a processing procedure when displaying the wind flow on the globe of the first virtual space. In a case where the globe 1 of the reality space is held up, the control unit 21 of the user terminal 2 executes the subroutine of the processing of displaying the first virtual space (step S241). The control unit 21, for example, acquires the information relevant to the wind (the wind speed, the wind direction, or the like) and the information relevant to the air temperature (for example, the air temperature bitmap) at each position of the globe region of the first virtual space from the weather data distribution system or the like by the communication unit 23 (step S242).

The control unit 21 displays the wind flow according to the acquired information relevant to the wind on the globe of the first virtual space in a display mode (for example, the color coding display) according to the acquired information relevant to the air temperature through the display unit 25 (step S243).

The control unit 21 acquires the image data of the character and the image data of the object from the server device through the communication unit 23 (step S244). The control unit 21 displays the acquired image data of the character as the augmented reality in the first virtual space through the display unit 25 (step S245).

The control unit 21 acquires the animation from the server device by the communication unit 23 (step S246). For example, the control unit 21 may acquire the animation that the character throws the object (for example, the paper airplane). The control unit 21 executes the acquired animation (step S247). The control unit 21 moves the object thrown by the character, in accordance with the wind flow, on the basis of the information relevant to the wind (step S248). The control unit 21 ends the processing.

According to this embodiment, it is possible to display the character performing the explanation as the augmented reality.

According to this embodiment, in a case where the character does not perform the explanation, it is possible to move the character on the globe of the first virtual space.

According to this embodiment, it is possible to display the wind flow according to the information relevant to the wind on the globe of the first virtual space.

According to this embodiment, it is possible to move the object thrown by the character, in accordance with the wind flow.

EMBODIMENT 4

Embodiment 4 relates to a mode in which the current position of the user is displayed in the first virtual space. Note that the description of the contents overlapping with those in Embodiments 1 to 3 will be omitted.

Figure 16A:
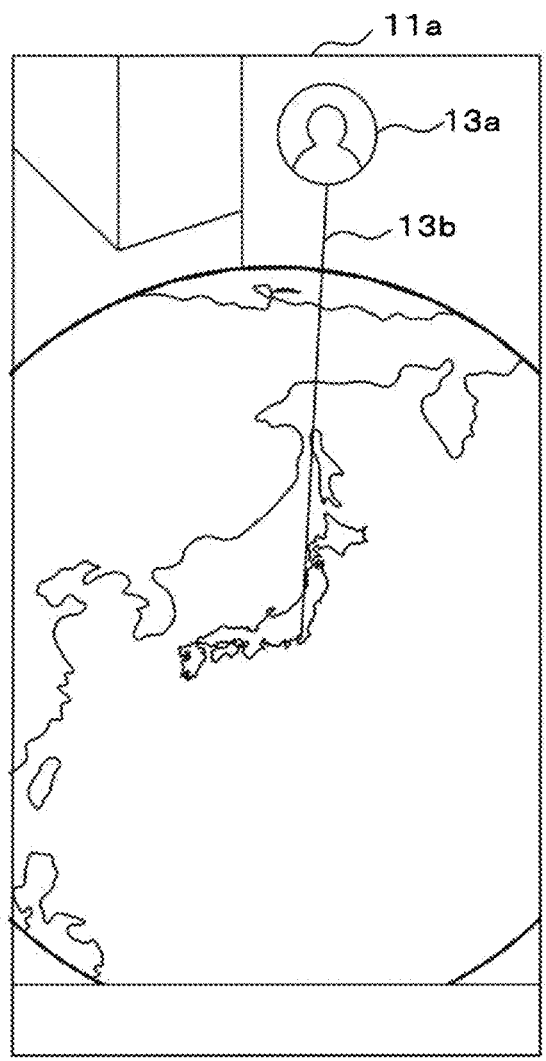
FIG. 16A is an explanatory drawing illustrating an example of a screen displaying a current position of a user in the first virtual space.
Figure 16B:
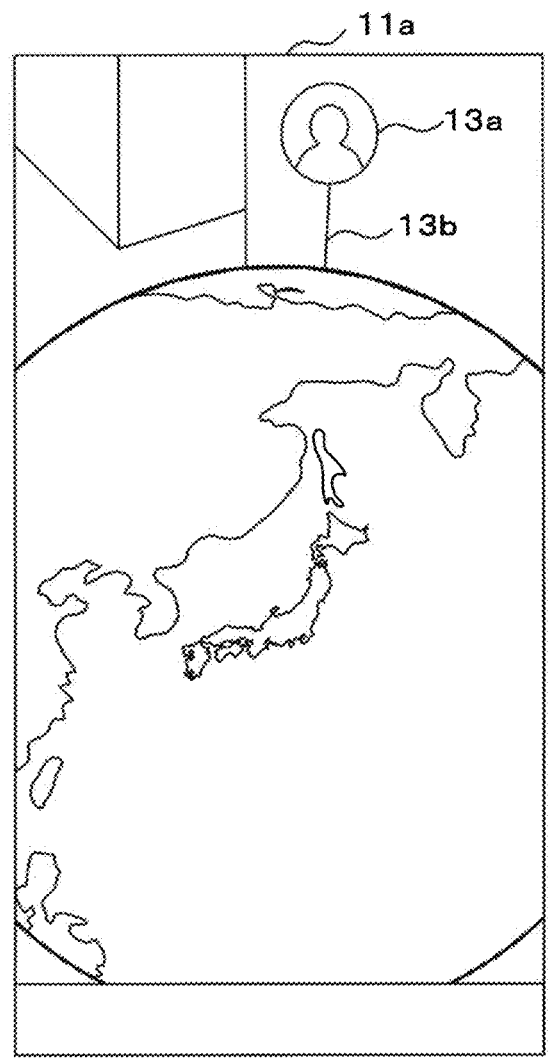
FIG. 16B is an explanatory drawing illustrating an example of a screen displaying a current position of a user in the first virtual space.

FIG. 16A and FIG. 16B are an explanatory drawing illustrating an example of a screen displaying the current position of the user in the first virtual space. FIG. 16A is an explanatory drawing illustrating an example of a display screen when the current position is on the front side of the globe region. FIG. 16B is an explanatory drawing illustrating an example of a display screen when the current position is on a side opposite to the globe region.

The screen includes a current position icon 13a and a straight line 13b. The current position icon 13a is an icon displayed outside the globe region of the first virtual space, in association with the current position of the user. The straight line 13b is a straight line connecting the current position icon 13a and the current position of the user.

The user terminal 2, for example, acquires the current position of the user through a global positioning system (GPS) module or the like, built in the user terminal 2. The user terminal 2 displays the current position icon 13a outside the globe region of the first virtual space. The user terminal 2 creates the straight line 13b connecting the acquired current position and the displayed current position icon 13a. The user terminal 2 displays the created straight line 13b in the first virtual space display section 11a.

As illustrated in FIG. 16A, in a case where the current position of the user is on the front side of the globe region of the first virtual space, the user terminal 2 displays the current position icon 13a above the globe region of the first virtual space in the first virtual space display section 11a, and displays the straight line 13b connecting the current position and the current position icon 13a.

In addition, as illustrated in FIG. 16B, in a case where the current position of the user is on a side opposite to the globe region of the first virtual space, the user terminal 2 displays the current position icon 13a in the first virtual space display section 11a, and does not display a part of the straight line hidden by the globe, in the straight line 13b.

Figure 17:
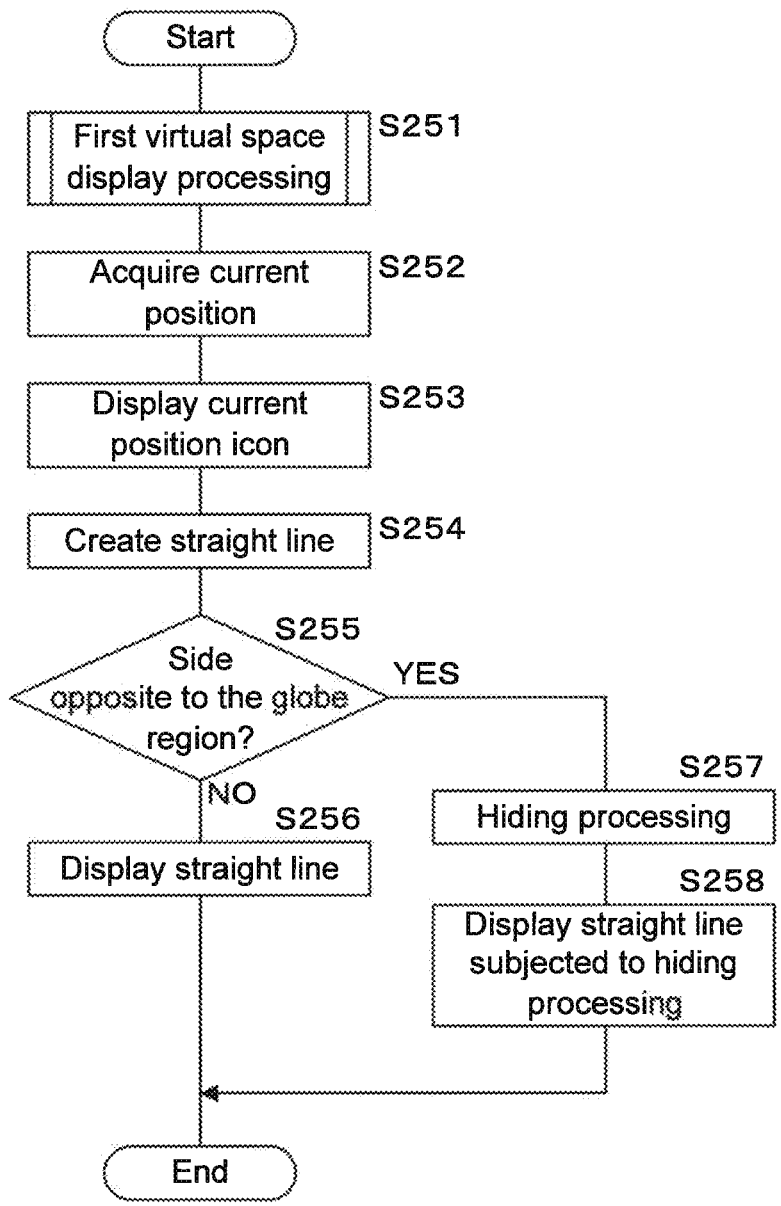
FIG. 17 is a flowchart illustrating a processing procedure when displaying the current position of the user in the first virtual space.

FIG. 17 is a flowchart illustrating a processing procedure when displaying the current position of the user in the first virtual space. In a case where the globe 1 of the reality space is held up, the control unit 21 of the user terminal 2 executes the subroutine of the processing of displaying the first virtual space (step S251). The control unit 21, for example, acquires the current position of the user through the GPS module or the like, built in the user terminal 2 (step S252).

The control unit 21 displays the current position icon 13a indicating the acquired current position outside the globe region of the first virtual space through the display unit 25 (step S253). The control unit 21 creates the straight line 13b connecting the acquired current position and the displayed current position icon 13a (step S254). The control unit 21 determines whether the current position is on a side opposite to the globe region of the first virtual space, on the basis of the longitude and latitude of the acquired current position (step S255).

In a case where the current position is on the front side of the globe region (NO in step S255), the control unit 21 displays the created straight line 13b in the first virtual space through the display unit 25 (step S256). The control unit 21 ends the processing.

In a case where the current position is on a side opposite to the globe region (YES in step S255), the control unit 21 performs hiding processing not to display a part of the straight line hidden by the globe, in the created straight line 13b (step S257). The control unit 21 displays the straight line 13b subjected to the hiding processing in the first virtual space through the display unit 25 (step S258). The control unit 21 ends the processing.

According to the processing described above, the straight line connecting the current position icon and the current position of the user is more preferentially displayed than the object such as the cloud in the first virtual space, and thus, it is possible to prevent the current position of the user on the globe indicating the end point of the straight line from being lost. In addition, by performing the display processing in which the straight line is hidden by the globe, it is possible to definitely grasp that the current position of the user (the end point of the straight line) is on a side opposite to the globe region.

According to this embodiment, it is possible to display the current position of the user in the first virtual space.

According to this embodiment, it is possible to display the current position icon displayed outside the globe region of the first virtual space, and the straight line connecting the current position icon and the current position in the first virtual space.

EMBODIMENT 5

Embodiment 5 relates to a mode in which a composite content icon indicating a plurality of contents is displayed in the first virtual space. Note that the description of the contents overlapping with those Embodiments 1 to 4 will be omitted.

The content, for example, includes a national flag, a badge, a medal, or the like. In a case where a plurality of content icons are displayed in a small display region, there is a problem such as the content icons not falling within the region or each of the content icons displayed overlapping each other. Therefore, there has been a demand for a display technology of a composite content icon in which a problem can be solved.

Note that hereinafter, an example will be described in which the content is a national flag, but the same can be applied to other types of contents.

In a case where national flags of neighboring countries with a small national land area are displayed in the globe region of the first virtual space, national flag icons indicating the national flags are displayed overlapping each other, and thus, it is difficult to distinguish between the national flag icons for each of the countries. As a result thereof, there is a problem that it is difficult to select the national flag icon. Then, by using a composite national flag icon indicating national flags of a plurality of countries, it is possible to solve the problem described above.

For example, for Finland, Denmark, Sweden, and Norway in North Europe, in a case where a national flag icon of Finland, a national flag icon of Denmark, a national flag icon of Sweden, and a national flag icon of Norway are respectively displayed, the national flag icons do not fall within the display region, and thus, a composite national flag icon indicating national flags of four countries can be used.

Figure 18A:
FIG. 18A is an explanatory drawing illustrating an example of a display screen of a national flag icon and a composite national flag icon.
Figure 18B:
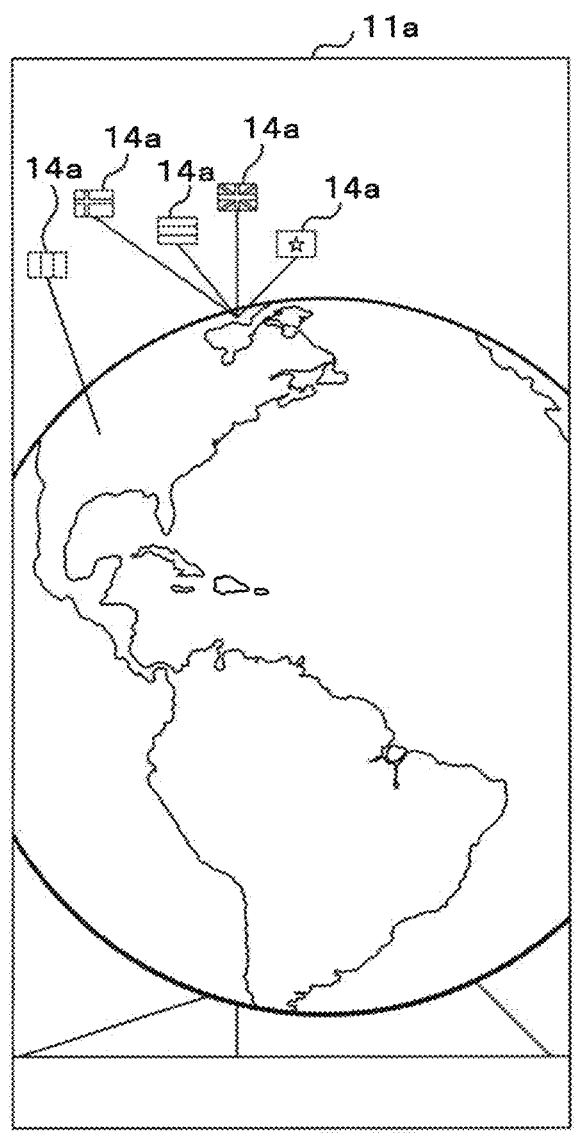
FIG. 18B is an explanatory drawing illustrating an example of a display screen of a national flag icon and a composite national flag icon.

FIG. 18A and FIG. 18B are an explanatory drawing illustrating an example of a display screen of the national flag icon and the composite national flag icon. FIG. 18A is an explanatory drawing illustrating an example of a screen for receiving a selection manipulation of the composite national flag icon. FIG. 18B is an explanatory drawing illustrating an example of a display screen of each national flag icon corresponding to the composite national flag icon.

The screen includes a national flag icon 14a and a composite national flag icon 14b. The national flag icon 14a is a national flag icon indicating a national flag. The composite national flag icon 14b is a composite national flag icon indicating a plurality of national flags.

In a case where the composite national flag icon, for example, indicates national flags of four countries, the composite national flag icon may be provided such that the national flag icon of each of the countries or a part of the national flag icon is displayed in four cells divided by four intersecting grid lines. Alternatively, the composite national flag icon may be provided such that the national flag icon of each of the countries to be a target is reduced, and each of the reduced national flag icons is displayed side by side in the region of the composite national flag icon.

Note that the number of national flags displayed in the composite national flag icon is not particularly limited. The number of national flags displayed in the composite national flag icon may be set in accordance with the number of neighboring countries, and for example, may be 3, 4, or the like.

In a case where the globe 1 of the reality space is held up, the user terminal 2 imports the photographed image of the globe 1 through the photographing unit 26 to display the photographed image of the globe 1 including the globe region in the first virtual space display section 11a.

The user terminal 2 specifies each of the positions of the globe region displayed in the photographed image, on the basis of the marker information in the photographed image of the globe 1. For example, the user terminal 2 recognizes the AR marker information, in accordance with the globe region displayed in the photographed image. The user terminal 2 extracts the position information, on the basis of the recognized AR marker information.

The user terminal 2 acquires the national flag icon of the corresponding country, and the composite national flag icon indicating the national flags of the neighboring countries from an external server device or the like, with reference to the extracted position information. Note that the national flag icon and the composite national flag icon may be stored in advance in the storage unit 22 or the high-capacity storage unit 27 of the user terminal 2.

The user terminal 2 displays the acquired national flag icon of each of the countries in the corresponding national flag icon 14a. The user terminal 2 creates a straight line connecting the position of each of the countries and each of the national flag icons 14a. The user terminal 2 displays the national flag icon 14a, and displays the created straight line in the first virtual space display section 11a.

The user terminal 2 displays the acquired composite national flag icon in the corresponding composite national flag icon 14b. The user terminal 2 creates a straight line connecting a position corresponding to the composite national flag icon 14b and the composite national flag icon 14b. The position corresponding to the composite national flag icon 14b, for example, may be the center position in the regions of the plurality of countries indicated by the composite national flag icon 14b, or may be the position of any one country of the plurality of countries. The user terminal 2 displays the composite national flag icon 14b, and displays the created straight line in the first virtual space display section 11a.

As an example, in the first virtual space display section 11a, the composite national flag icon 14b indicating the national flag of Finland, the national flag of Denmark, the national flag of Sweden, and the national flag of Norway, and the straight lines connecting the positions corresponding to such four countries and the composite national flag icon 14b are displayed.

Note that in FIGS. 18A and 18B, examples are illustrated in which the national flag icon 14a and the straight line, and the composite national flag icon 14b and the straight line are displayed above or diagonally above the corresponding position, but the invention is not limited thereto. For example, the national flag icon 14a and the straight line, and the composite national flag icon 14b and the straight line may be displayed below or diagonally below the corresponding position.

In a case where the selection manipulation of the composite national flag icon 14*b* is received, the user terminal 2 separately displays a combination of the national flag icon 14*a* of each of the corresponding countries and the straight line. For example, the user terminal 2 receives the selection manipulation of the composite national flag icon 14*b* indicating the national flag of Finland, the national flag of Denmark, the national flag of Sweden, and the national flag of Norway.

As illustrated in FIG. 18B, the user terminal 2 separates a combination of the national flag icon 14*a* of Finland, the national flag icon 14*a* of Denmark, the national flag icon 14*a* of Sweden, and the national flag icon 14*a* of Norway, corresponding to the composite national flag icon 14*b*, and the straight line (the straight line connecting such national flag icons 14*a* and the position of each of the countries) from the selected composite national flag icon 14*b*.

The user terminal 2 displays the separated national flag icons 14*a* of four countries, and the straight line connecting the position of each of the countries and each of the national flag icons 14*a* above the globe region of the first virtual space. Note that the display position after separation is not limited to above the globe region, and may be any region that can be displayed.

FIG. 19 is a flowchart illustrating a processing procedure when receiving the selection manipulation of the composite national flag icon. In a case where the globe 1 of the reality space is held up, the control unit 21 of the user terminal 2 executes the subroutine of the processing of displaying the first virtual space (step S261). The control unit 21 acquires the national flag icon of each of the corresponding countries, and the composite national flag icon including the national flags of the plurality of countries from the server device through the communication unit 23, in accordance with the position information extracted on the basis of the AR marker information (step S262).

The control unit 21 displays the acquired national flag icon of each of the countries, and the straight line connecting the position of each of the countries and each of the national flag icons 14*a* in a predetermined position of the first virtual space through the display unit 25 (step S263). The predetermined position, for example, may be above or diagonally above the position of each of the countries.

The control unit 21 displays each of the acquired composite national flag icons, and the straight line connecting the position corresponding to each of the composite national flag icons and each of the composite national flag icons in a predetermined position of the first virtual space through the display unit 25 (step S264). The predetermined position, for example, may be above or diagonally above the position corresponding to the composite national flag icon.

The control unit 21 receives the selection manipulation of the composite national flag icon through the input unit 24 (step S265). The control unit 21 acquires the national flag icon of each of the countries corresponding to the selected composite national flag icon from the server device through the communication unit 23 (step S266). The control unit 21 displays the acquired national flag icon of each of the countries, and the straight line connecting the position of each of the countries and each of the national flag icons in the predetermined position of the first virtual space (for example, above the globe region) through the display unit 25 (step S267). The control unit 21 ends the processing.

According to this embodiment, it is possible to display the content icon and the straight line in the predetermined position of the first virtual space.

According to this embodiment, it is possible to display the composite content icon and the straight line in the predetermined position of the first virtual space.

According to this embodiment, in a case where the selection of the composite content icon is received, it is possible to separately display the combination of the content icon of each of the corresponding contents and the straight line.

The embodiments disclosed herein should be considered as illustrative in all respects and not restrictive. The scope of the invention is indicated by the claims, but not the meaning described above, and is intended to include the meaning equivalent to the claims and all modifications within the scope.

The respects described in each embodiment can be combined with each other. In addition, the independent and dependent claims set forth in the claims can be combined with each other in any and all combinations, regardless of the format of reference. Further, the claims are in a format in which a claim refers to two or more other claims (the format of a multiple dependent claim), but the invention is not limited thereto.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A non-transitory computer-readable recording medium with a program recorded causing a computer to execute processing of:
   acquiring an altitude of a cloud at each position;
   displaying, when a photographed image of a globe of a reality space is imported, a globe of a first virtual space, in response to a movement of the globe of the reality space, while three-dimensionally displaying a cloud according to a specified altitude at a corresponding position on the first virtual space; and
   adjusting light and shade of the cloud at each position, on the basis of a visual line with respect to the globe of the first virtual space, and the altitude of the cloud at each position.

2. The program according to claim 1,
   wherein an infrared image of the cloud is acquired, and
   the altitude of the cloud at each position is estimated on the basis of the acquired infrared image.

3. The program according to claim 1,
   wherein a slope between clouds is calculated on the basis of the altitude of the cloud at each position, and
   brightness of the cloud at each of the positions is adjusted on the basis of a light source and the calculated slope between clouds.

4. The program according to claim 1,
   wherein rainfall at each position is acquired, and
   a raindrop animation is displayed at each position, in accordance with the acquired rainfall.

5. The program according to claim 4,
   wherein rainfall of a region specified by a plurality of position groups is specified,
   a region is selected in accordance with weighting according to the specified rainfall, and
   the raindrop animation is displayed in the selected region.

6. The program according to claim 4,
wherein an air temperature at each position is acquired, and
a snow animation is displayed at a position in which the acquired air temperature is lower than or equal to a predetermined temperature, instead of the raindrop animation.

7. The program according to claim 1,
wherein a character performing explanation is displayed as augmented reality, and
when the character does not perform the explanation, the character is moved on the globe of the first virtual space.

8. The program according to claim 7,
wherein information relevant to wind at each position is acquired,
a wind flow according to the acquired information relevant to the wind is displayed on the globe of the first virtual space, and
an object thrown by the character is moved in accordance with the wind flow.

9. The program according to claim 1,
wherein information relevant to wind and information relevant to an air temperature at each position are acquired, and
in a display mode according to the acquired information relevant to the air temperature, a wind flow according to the acquired information relevant to the wind is displayed on the globe of the first virtual space.

10. The program according to claim 1,
wherein a current position of a user is acquired, and
the acquired current position of the user is displayed in the first virtual space.

11. The program according to claim 10,
wherein a current position icon displayed outside a globe region of the first virtual space, and a straight line connecting the current position icon and the current position are displayed in the first virtual space.

12. The program according to claim 11,
wherein when the current position is on a side opposite to the globe region of the first virtual space, the current position icon is displayed, and a part of the straight line hidden by the globe is not displayed.

13. The program according to claim 1,
wherein a content icon indicating a content and a first straight line connecting a position corresponding to the content icon and the content icon are displayed at a predetermined position,
a composite content icon indicating a plurality of contents and a second straight line connecting a position corresponding to the composite content icon and the composite content icon are displayed at a predetermined position, and
when selection of the composite content icon is received, a combination of a content icon of each corresponding content and the first straight line is separately displayed.

14. An information processing method for causing a computer to execute processing
acquiring an altitude of a cloud at each position;
displaying, when a photographed image of a globe of a reality space is imported, a globe of a first virtual space, in response to a movement of the globe of the reality space, while three-dimensionally displaying a cloud according to a specified altitude at a corresponding position on the first virtual space; and
adjusting light and shade of the cloud at each position, on the basis of a visual line with respect to the globe of the first virtual space, and the altitude of the cloud at each position.

15. An information processing device, comprising
one or more processing devices; and
one or more storage devices storing instructions for causing the one or more processing devices to execute,
the following processing of:
acquiring an altitude of a cloud at each position,
displaying, when a photographed image of a globe of a reality space is imported, a globe of a first virtual space, in response to a movement of the globe of the reality space, while three-dimensionally displaying a cloud according to a specified altitude at a corresponding position on the first virtual space, and
adjusting light and shade of the cloud at each position, on the basis of a visual line with respect to the globe of the first virtual space, and the altitude of the cloud at each position.

16. A non-transitory computer-readable recording medium with a program recorded causing a computer to execute processing of:
acquiring an altitude of a cloud at each position;
displaying, when a photographed image of a globe of a reality space is imported, a globe of a first virtual space, in response to a movement of the globe of the reality space, while three-dimensionally displaying a cloud according to a specified altitude at a corresponding position on the first virtual space;
calculating a slope between clouds, on the basis of the altitude of the cloud at each of the positions; and
adjusting brightness of the cloud at each of the positions, on the basis of a light source and the calculated slope between the clouds.

17. A non-transitory computer-readable recording medium with a program recorded causing a computer to execute processing of:
acquiring an altitude of a cloud at each position;
displaying, when a photographed image of a globe of a reality space is imported, a globe of a first virtual space, in response to a movement of the globe of the reality space, while three-dimensionally displaying a cloud according to a specified altitude at a corresponding position on the first virtual space;
acquiring rainfall at each position;
displaying a raindrop animation at each position, in accordance with the acquired rainfall;
specifying rainfall of a region specified by a plurality of position groups;
selecting a region, in accordance with weighting according to the specified rainfall; and
displaying the raindrop animation in the selected region.

18. A non-transitory computer-readable recording medium with a program recorded causing a computer to execute processing of:
acquiring an altitude of a cloud at each position;
displaying, when a photographed image of a globe of a reality space is imported, a globe of a first virtual space, in response to a movement of the globe of the reality space, while three-dimensionally displaying a cloud according to a specified altitude at a corresponding position on the first virtual space;
acquiring rainfall at each position;
displaying a raindrop animation at each position, in accordance with the acquired rainfall;

acquiring an air temperature at each position; and displaying a snow animation at a position in which the acquired air temperature is lower than or equal to a predetermined temperature, instead of the raindrop animation.

19. A non-transitory computer-readable recording medium with a program recorded causing a computer to execute processing of:

acquiring an altitude of a cloud at each position;

displaying, when a photographed image of a globe of a reality space is imported, a globe of a first virtual space, in response to a movement of the globe of the reality space, while three-dimensionally displaying a cloud according to a specified altitude at a corresponding position on the first virtual space;

displaying a character performing explanation as augmented reality; and moving the character onto the globe of the first virtual space when the character does not perform the explanation.

20. A non-transitory computer-readable recording medium with a program recorded causing a computer to execute processing of:

acquiring an altitude of a cloud at each position;

displaying, when a photographed image of a globe of a reality space is imported, a globe of a first virtual space, in response to a movement of the globe of the reality space, while three-dimensionally displaying a cloud according to a specified altitude at a corresponding position on the first virtual space;

acquiring a current position of a user;

displaying the acquired current position of the user in the first virtual space; and displaying a current position icon displayed outside a globe region of the first virtual space, and a straight line connecting the current position icon and the current position in the first virtual space.

21. A non-transitory computer-readable recording medium with a program recorded causing a computer to execute processing of:

acquiring an altitude of a cloud at each position;

displaying, when a photographed image of a globe of a reality space is imported, a globe of a first virtual space, in response to a movement of the globe of the reality space, while three-dimensionally displaying a cloud according to a specified altitude at a corresponding position on the first virtual space;

displaying a content icon indicating a content and a first straight line connecting a position corresponding to the content icon and the content icon at a predetermined position;

displaying a composite content icon indicating a plurality of contents and a second straight line connecting a position corresponding to the composite content icon and the composite content icon at a predetermined position; and separately displaying a combination of a content icon of each corresponding content and the first straight line when selection of the composite content icon is received.

* * * * *